(12) United States Patent
Bakkegaard et al.

(10) Patent No.: US 12,547,617 B2
(45) Date of Patent: Feb. 10, 2026

(54) PROTECTIVE DISTRIBUTED DATABASE SERVICE

(71) Applicant: CrowdStrike, Inc., Sunnyvale, CA (US)

(72) Inventors: Nick Bakkegaard, Skanderborg (DK); Kristian Cordes-Andersen, Aarhus C (DK); Rasmus Scheel Killmann, Aarhus V (DK); Peter Mechlenborg, Silkeborg (DK); Anders Hauge Nissen, Brabrand (DK)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/407,562

(22) Filed: Jan. 9, 2024

(65) Prior Publication Data

US 2025/0225131 A1 Jul. 10, 2025

(51) Int. Cl.
*G06F 16/2453* (2019.01)
*G06F 11/34* (2006.01)
*G06F 16/2458* (2019.01)

(52) U.S. Cl.
CPC ...... *G06F 16/2453* (2019.01); *G06F 11/3442* (2013.01); *G06F 16/2471* (2019.01)

(58) Field of Classification Search
None
See application file for complete search history.

(56) References Cited

U.S. PATENT DOCUMENTS

| | | | |
|---|---|---|---|
| 7,797,333 B1 * | 9/2010 | Chapman | G06F 16/2471 709/208 |
| 10,860,609 B1 | 12/2020 | Breß | |
| 2014/0280032 A1 | 9/2014 | Kornacker et al. | |
| 2015/0234895 A1 | 8/2015 | Erdogan et al. | |
| 2016/0188705 A1 | 6/2016 | Schreck et al. | |
| 2016/0253391 A1 * | 9/2016 | Burns | G06F 16/24564 707/722 |
| 2018/0089278 A1 * | 3/2018 | Bhattacharjee | H04L 43/12 |
| 2019/0138642 A1 * | 5/2019 | Pal | G06F 16/2471 |
| 2019/0340274 A1 * | 11/2019 | Keller | G06F 16/2282 |
| 2022/0414100 A1 | 12/2022 | Carter et al. | |

FOREIGN PATENT DOCUMENTS

CN 116501756 A 7/2023

* cited by examiner

*Primary Examiner* — Yu Zhao
(74) *Attorney, Agent, or Firm* — Law Office of Scott P. Zimmerman, PLLC

(57) ABSTRACT

Computer nodes associated with a cluster store a distributed database. The computer nodes are polled to retrieve their individual nodal query states. A coordinator node then merges the individual nodal query states to determine an overall query state associated with the distributed database. The coordinator node, though, has a memory capacity that can be overcome by some nodal query states. The coordinator node thus imposes a data size limit on the nodal query states to prevent memory failures. The coordinator node specifies the data size limit during any polling cycle, and the coordinator node receives compliant nodal query states that satisfy the data size limit. The coordinator node may adjust or revise the data size limit for subsequent polling cycles, based on a count of the nodal query states yet to be retrieved. The data size limit thus ensures that the memory capacity is not overcome during any polling cycle.

20 Claims, 24 Drawing Sheets

PROTECTIVE DISTRIBUTED DATABASE SERVICE

BACKGROUND

The subject matter described herein generally relates to computers and to computer databases and, more particularly, the subject matter relates to query processing, to distributed queries, to query optimization, and to map-reduce operations.

Today's computer databases are large. Many computer databases are thus distributed across different computer nodes, and each computer node only stores a portion (or shard) of the entire computer database. When the entire computer database must be queried for a result, each one of the computer nodes queries its shard of the entire computer database. Each computer node generates a nodal query state that represents a query result of only its shard of the entire computer database. A so-called coordinator node may then collect all the nodal query states generated by the computer nodes storing the different shards of the entire computer database. The coordinator node may also merge the nodal query states to generate a partial or an overall result or query state representing the computer database.

SUMMARY

Computer nodes participate in a protective distributed database service. The computer nodes store portions, or shards, of a distributed database. The protective distributed database service polls the computer nodes for their nodal query states representing their individual shards of the distributed database. A coordinator node then merges the nodal query states to determine a partial, or an overall, query state associated with the distributed database. The coordinator node, though, has a finite amount of memory capacity (in bits or bytes). If one or more of the nodal query states consumes more than the coordinator node's memory capacity, warnings and crashes may occur. The combined or merged bit size of the nodal query states may also consume more than the coordinator node's memory capacity. The protective distributed database service thus imposes a data size limit that cannot exceed the coordinator node's memory capacity. The data size limit constrains or limits the bit size associated with any nodal query state. The data size limit prevents any nodal query state from exceeding the memory capacity available to the coordinator node. The data size limit also prevents merged nodal query states from also exceeding the memory capacity available to the coordinator node. So, when any computer node is polled for its nodal query state, the protective distributed database service also specifies the data size limit. The coordinator node receives only those nodal query states that satisfy or comply with the data size limit. If some nodal query states cannot comply with the data size limit, then the coordinator node may increase the data size limit and conduct more polling cycles. The coordinator node may thus retrieve the nodal query states in polling rounds according to their increasing data sizes. The data size limit ensures that the coordinator node's memory capacity is not overcome during any polling cycle. Computer functioning is improved by reducing memory crashes/failures and warnings for insufficient memory.

BRIEF DESCRIPTION OF THE SEVERAL VIEWS OF THE DRAWINGS

The features, aspects, and advantages of the protective distributed database service are understood when the following Detailed Description is read with reference to the accompanying drawings, wherein.

DETAILED DESCRIPTION

Figure 1:
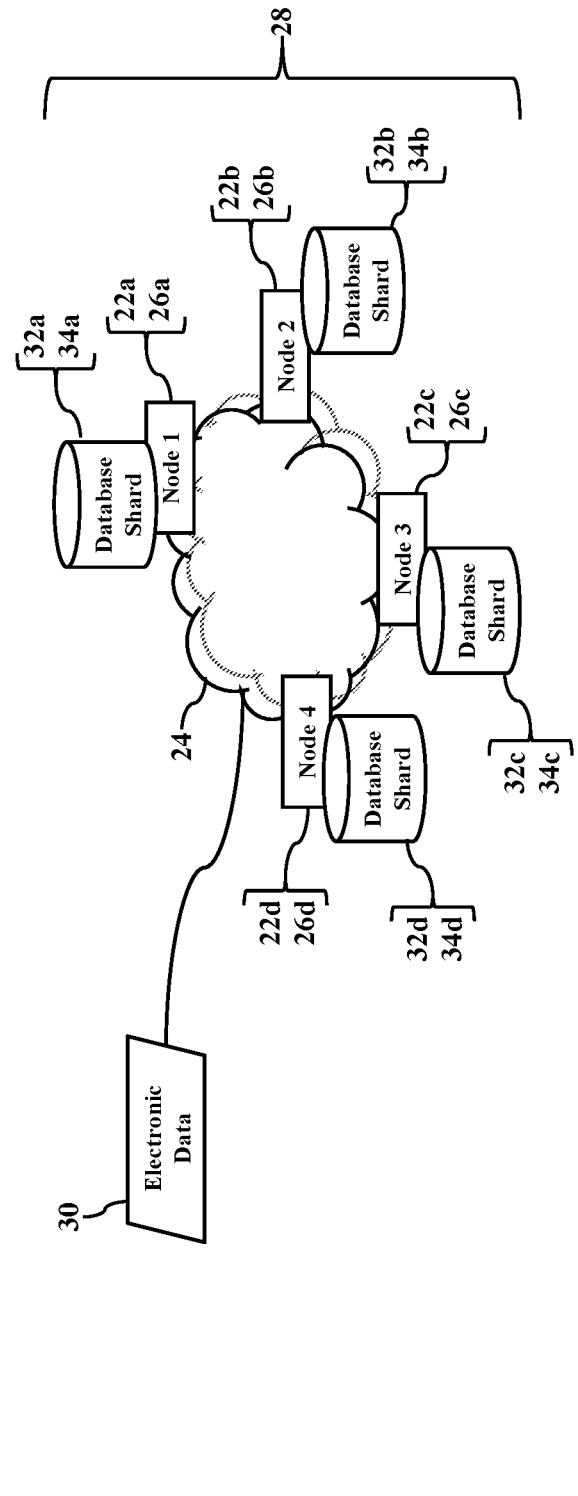
FIGS. 1-4 illustrate some examples of the protective distributed database service.

Distributed databases, however, cause memory problems. A coordinator node has a finite amount of memory for storing nodal query states and/or a merged query state. Sometimes any one or more of the nodal query states may have bit sizes that exceed the coordinator node's memory. Moreover, the merged query state of the entire computer database may also have a bit size that exceeds the coordinator node's memory. Whenever the nodal query state, or the merged query state, exceeds the coordinator node's finite amount of memory, the coordinator node may crash or fail and perhaps jeopardize the integrity of the distributed database.

Some examples of this disclosure relate to a protective distributed database service. Today's databases are very large and might not (or cannot) be stored by a single computer. Many computer databases are thus distributed among different computers, and each computer stores a smaller portion (or shard) of the entire computer database. When the entire computer database must be queried for a result, the protective distributed database service, instead, queries each one of the computers storing a smaller shard. Each computer generates a so-called nodal query state, which represents a query result or response based on the smaller shard. A coordinator computer collects all the nodal query states from the different computers. The coordinator computer then merges or joins all the nodal query states to obtain a partial representation of, or a total result (or query state), the computer database.

The protective distributed database service, though, protects the memory capacity available to the coordinator node. The coordinator computer has a finite, or limited, amount of computer memory. As the coordinator computer collects the nodal query states from the different computers, the coordinator computer stores the nodal query states in the computer memory. As more and more of the nodal query states are stored, more and more of the coordinator computer's memory is taken. Sometimes the coordinator computer could out of computer memory and crash or fail. The protective distributed database service, though, protects the memory capacity available to the coordinator node. The protective distributed database service, for example, imposes a data size limit. The data size limit restricts the bit size of any nodal query state. So, when the protective distributed database service queries the computers, the protective distributed database service also specifies the data size limit. Each computer generates its individual nodal query state, and each computer compares the bit size to the data size limit. If the nodal query state complies with (e.g., smaller than or equal to) the data size limit, then the computer may send the nodal query state to the coordinator computer. If, however, the bit size of the nodal query state is larger than the data size limit, then the computer is not authorized to send the nodal query state. By imposing the data size limit, the protective distributed database service ensures that no computer can send its nodal query state that exceeds the computer memory available to the coordinator computer. The protective distributed database service protects the coordinator computer to prevent crashes.

The protective distributed database service will now be described more fully hereinafter with reference to the accompanying drawings. The protective distributed database service, however, may be embodied and implemented in many different forms and should not be construed as limited to the examples set forth herein. These examples are provided so that this disclosure will be thorough and complete and fully convey the protective distributed database service to those of ordinary skill in the art. Moreover, all the examples of the protective distributed database service are intended to encompass both structural and functional equivalents thereof. Additionally, it is intended that such equivalents include both currently known equivalents as well as equivalents developed in the future (i.e., any elements developed that perform the same function, regardless of structure).

FIGS. 1-4 illustrate some examples of the protective distributed database service 20. Multiple computer systems 22 communicate via a communications network 24. FIG. 1 illustrates the computer systems 22 as computer nodes 26 associated with a computing cluster 28. In actual practice, the computing cluster 28 may have many, perhaps even hundreds, of the computer nodes 26. Such a large computer cluster 28, though, is too confusing and difficult to illustrate. For simplicity, then, FIG. 1 only illustrates four (4) computer systems 22a-d as the computer nodes 26a-d. The multiple computer systems 22, though, may have any geographical or logical grouping or organization (such as a data center or even a single computer machine). The protective distributed database service 20 receives any electronic data 30 and distributes the electronic data 30 among the computer systems 22a-d associated with the cluster 28. The protective distributed database service 20, in other words, distributes portions or shards 32a-d of an electronic database 34a-d among the computer nodes 26a-d. Any of the computer nodes 26 may thus store its corresponding database shard 32. Again, FIG. 1 only illustrates a simple example. In actual practice, the cluster 28 may have a hundred or more of the computer nodes 26 providing the protective distributed database service 20.

Figure 2:
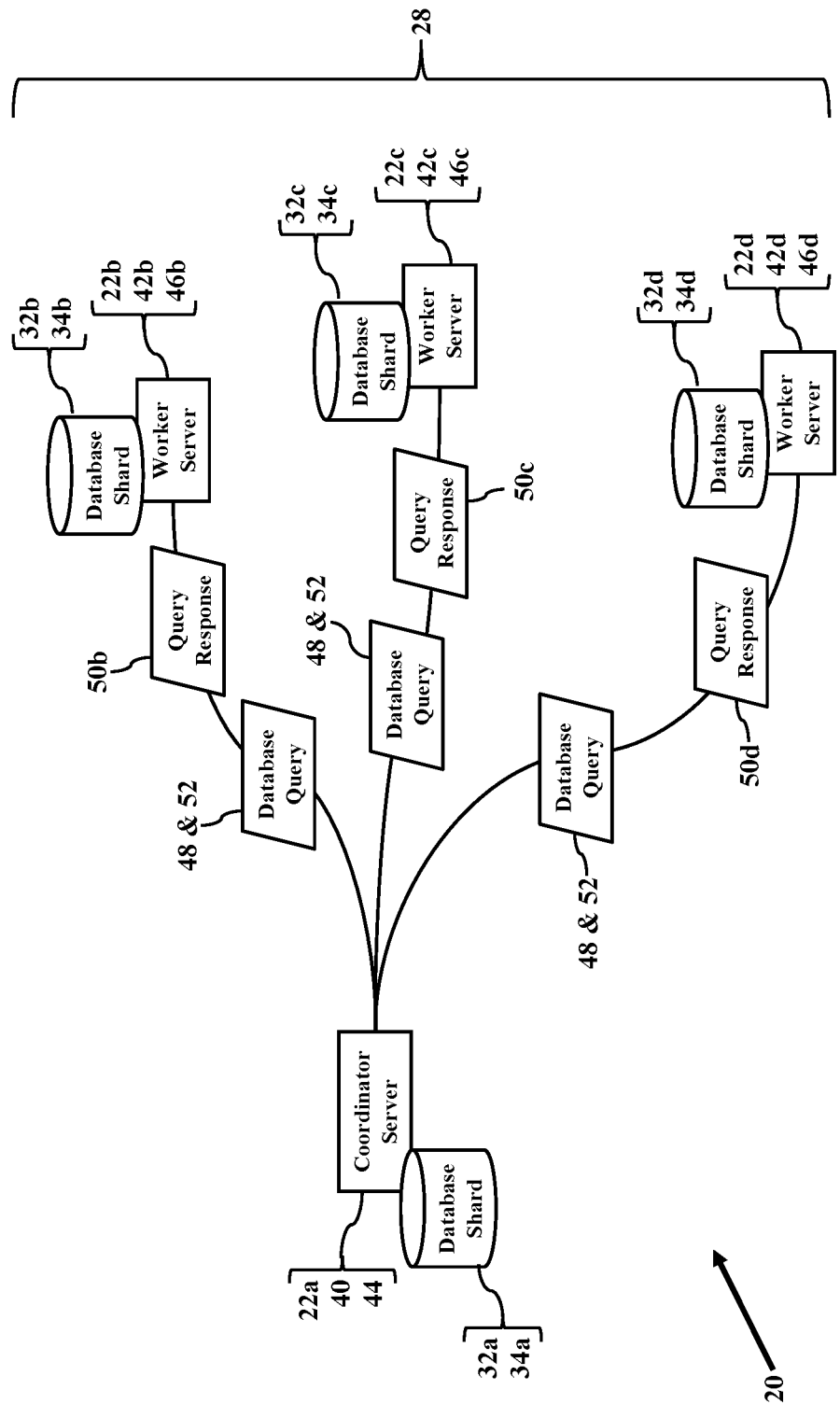

FIG. 2 illustrates role play. The protective distributed database service 20 may implement roles or responsibilities. The protective distributed database service 20, for example, may assign a coordinator role 40 and a worker role 42. The coordinator role 40 manages or administers the protective distributed database service 20, and the worker role 42 performs data storage/retrieval work. Any of the computer nodes 26 may have the coordinator role 40, and any of the computer nodes 26 may have the worker role 42. Indeed, any computer node 26 may dynamically switch from or between the coordinator role 40 and the worker role 42. Moreover, for simplicity, FIG. 2 illustrates the computer systems/nodes 26 as computer servers. The coordinator role 40, for example, is performed by a coordinator server 44, and worker servers 46 perform the worker role 42. The computer systems/nodes 26, however, may be any processor-controlled device (as later paragraphs will explain).

The protective distributed database service 20 may query the worker servers 46. Each worker server 46 stores its corresponding portion or shard 32 of the distributed database 34. When the protective distributed database service 20 needs access to the entire distributed database 34, the protective distributed database service 20 may query the worker servers 46. The protective distributed database service 20, for example, issues a database query 48 to the worker servers 46. While the database query 48 may originate from any network location associated with the cluster 28, FIG. 2, for simplicity, illustrates the database query 48 originating from the coordinator server 44. The coordinator server 44 may thus act as a query handler and issue the database query 48 to the worker servers 46. The coordinator server 44 may then collect, reduce, aggregate, and/or merge query responses 50 from the worker servers 46. The worker role 42 performs or carries out other query processing tasks, such as querying its database shard 32 (perhaps according to a query parameter 52 specified by the database query 48) and retrieving its corresponding query response 50. The coordinator role 40 and the worker role 42, though, may dynamically vary, change, or switch according to any performance or administrative criterion.

Figure 3:
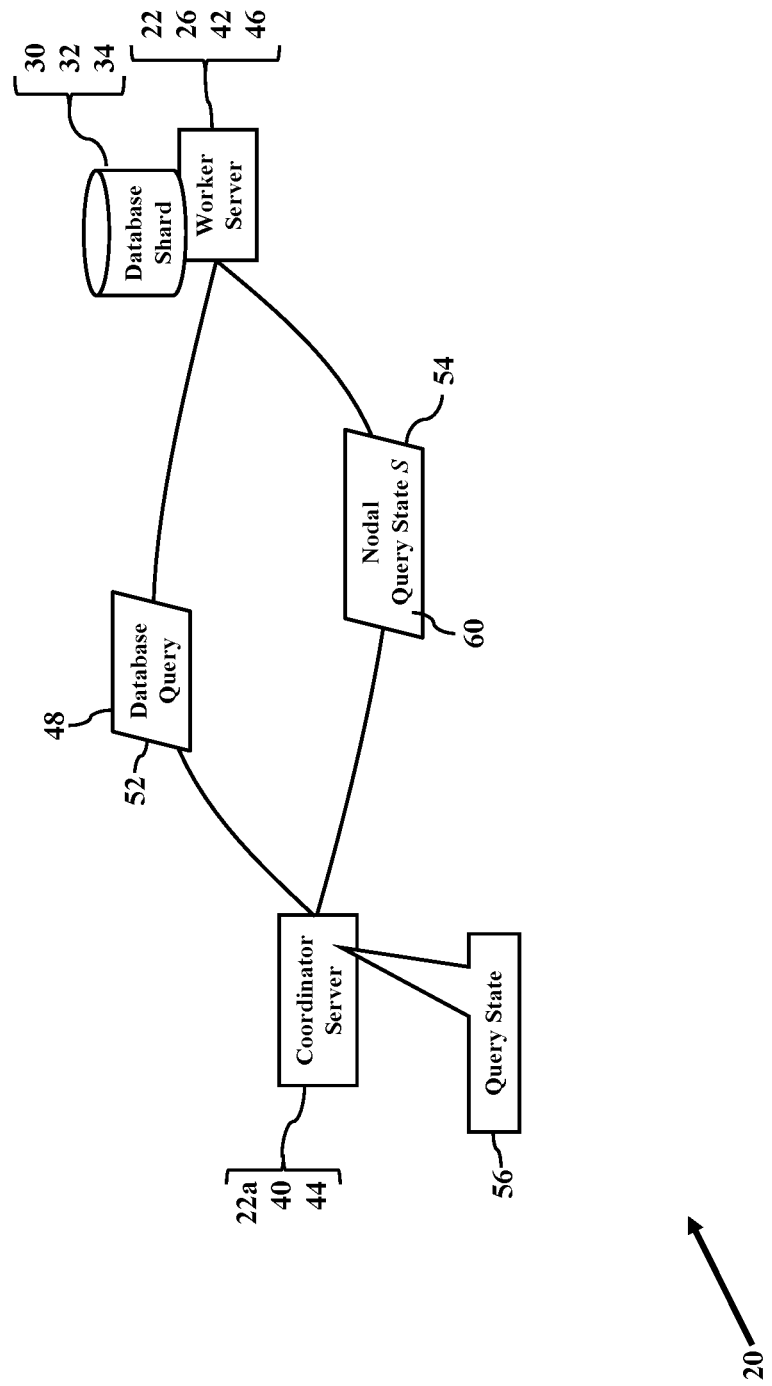
Figure 4:
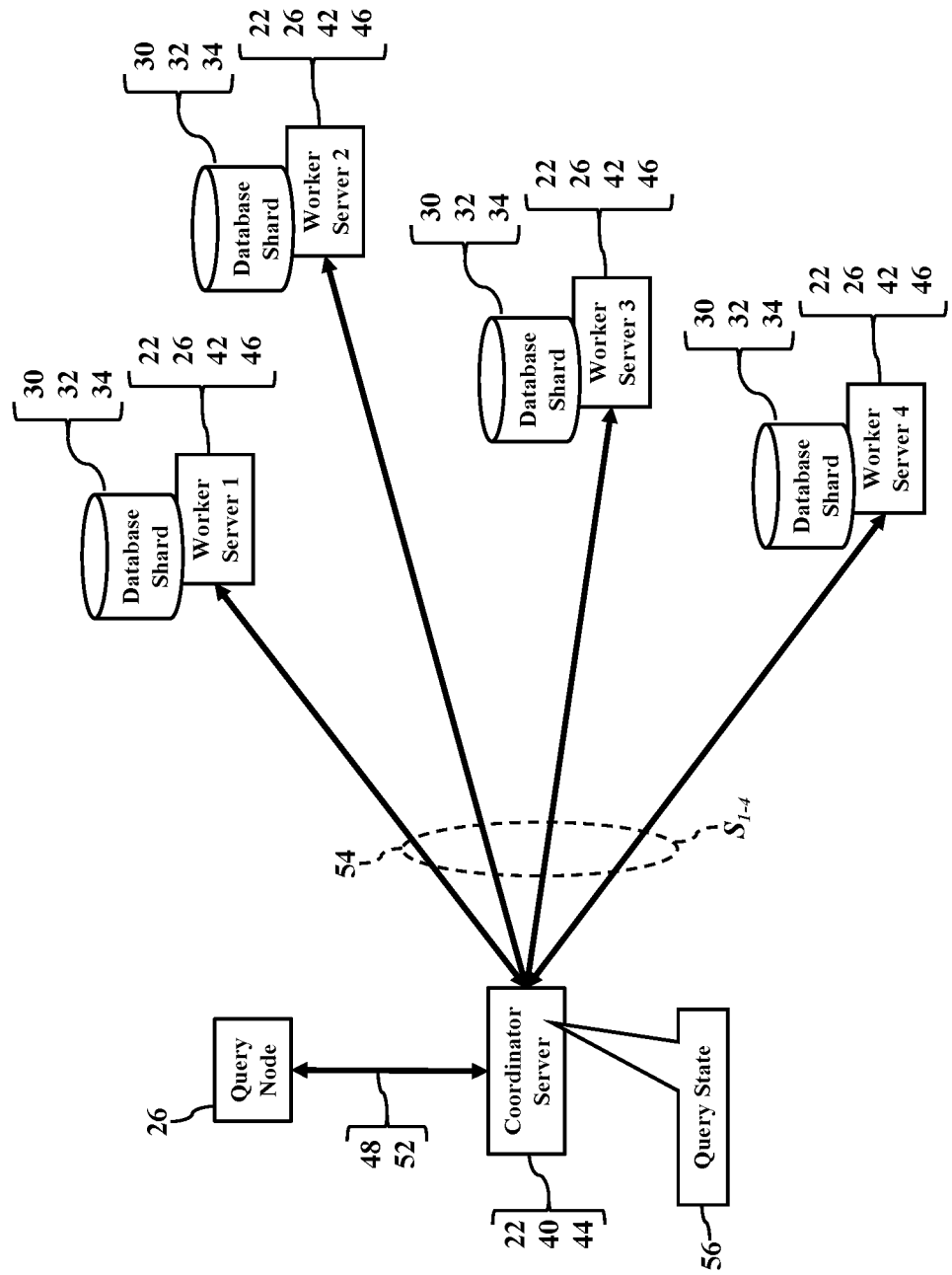

FIGS. 3-4 illustrate a nodal query state 54. The coordinator server 44 (assigned the coordinator role 40) may issue the database query 48 that specifies the query parameter 52. The database query 48 is sent via the communications network 24 (illustrated in FIG. 1) to the network address (e.g., IP address) associated with the worker server 46 participating in the protective distributed database service 20. When the worker server 46 receives the database query 48, the worker server 46 queries its corresponding database shard 32 (according to the query parameter 52) and identifies its corresponding nodal query state S (illustrated as reference numeral 54). As FIG. 4 illustrates, the database query 48 may originate from any network location (illustrated as a query node 26). In FIG. 4, for example, the query node 26 sends the database query 48 via the communications network 24 to the network address (e.g., IP address) associated with the coordinator server 44. The coordinator server 44 inspects the database query 48 and delegates the database query 48 to the appropriate worker server(s) 46. The coordinator server 44 may then route the database query 48 via the communications network 24 to the network address (e.g., IP address) associated with the desired or appropriate worker server 46. Each worker server 46 queries or maps the query parameter 52 to its database shard 32 and generates its corresponding nodal query state $S_{1-4}$ (perhaps as the query response 50). Each worker server 46 sends its corresponding nodal query state 54 to the coordinator server 44. The coordinator server 44 may then execute map-reduce operations that merge, join, aggregate, or otherwise reduce the nodal query states 54 (sent by the worker servers 46) to generate an overall or cumulative query result or query state 56. The query result 56 may then be sent to the query requestor (such as the query node 26).

Each nodal query state 54, and thus the total query state 56, has a bit size. The states 54 and 56 may thus quantify amounts of computer memory used by the database query/queries 48 during execution. The database query/queries 48 may contain different types of the query parameter 52, such as operations, filters, mutators, and/or aggregators. The complexity of the query parameter(s) 52 contributes to overall memory consumption. Large or complex query parameters 52, for example, may cause the nodal query state 54 to contain a larger list of search results in that part of the query chain. The size of the nodal query state 54 may thus depend on the number of search results and the type of operation. Even data compression techniques may still make the nodal query state 54 consume considerable memory.

The nodal query state 54, in particular, may consume too much computer memory. As the worker servers 46 execute the database query 48, each nodal query state S (illustrated as reference numeral 54) has a data size 60 (measured in bits/bytes). Each nodal query state 54 may thus vary in the data size 60, perhaps depending on the number or amount of the electronic data 30 matching the query parameter 52 and any additional query operations (such as filters, mutators, and aggregators) specified by the database query 48. Because the coordinator server 44 receives and merges the nodal query states 54, the coordinator server 44 at least momentarily or temporarily stores a copy of each nodal query state 54. The coordinator server 44 also stores the latest database query state 56 representing the merging of each nodal query state 54 sent by the worker servers/nodes 46/26. Moreover, the coordinator server 44 may also store one or more immutable copies of the nodal query states 54 and/or the resultant query state 56 for migration purposes. As the cluster 28 may have hundreds or more of the computer nodes 26 each providing their respective nodal query states 54, any single nodal query state 54 and/or merged nodal query states 56 may consume too much computer memory in the coordinator server 44. Excessive memory consumption may degrade the computer performance of the coordinator server 44. Indeed, when the worker servers 46 send their respective nodal query states 54, any of their individual data sizes 60 (or any merged file size associated with the query state 56) may exceed the amount of computer memory. Even data compression techniques may be unable to satisfy memory allocations. Simply put, excessive memory consumption may cause memory crashes, query failures, and/or warnings for insufficient memory.

Figure 5:
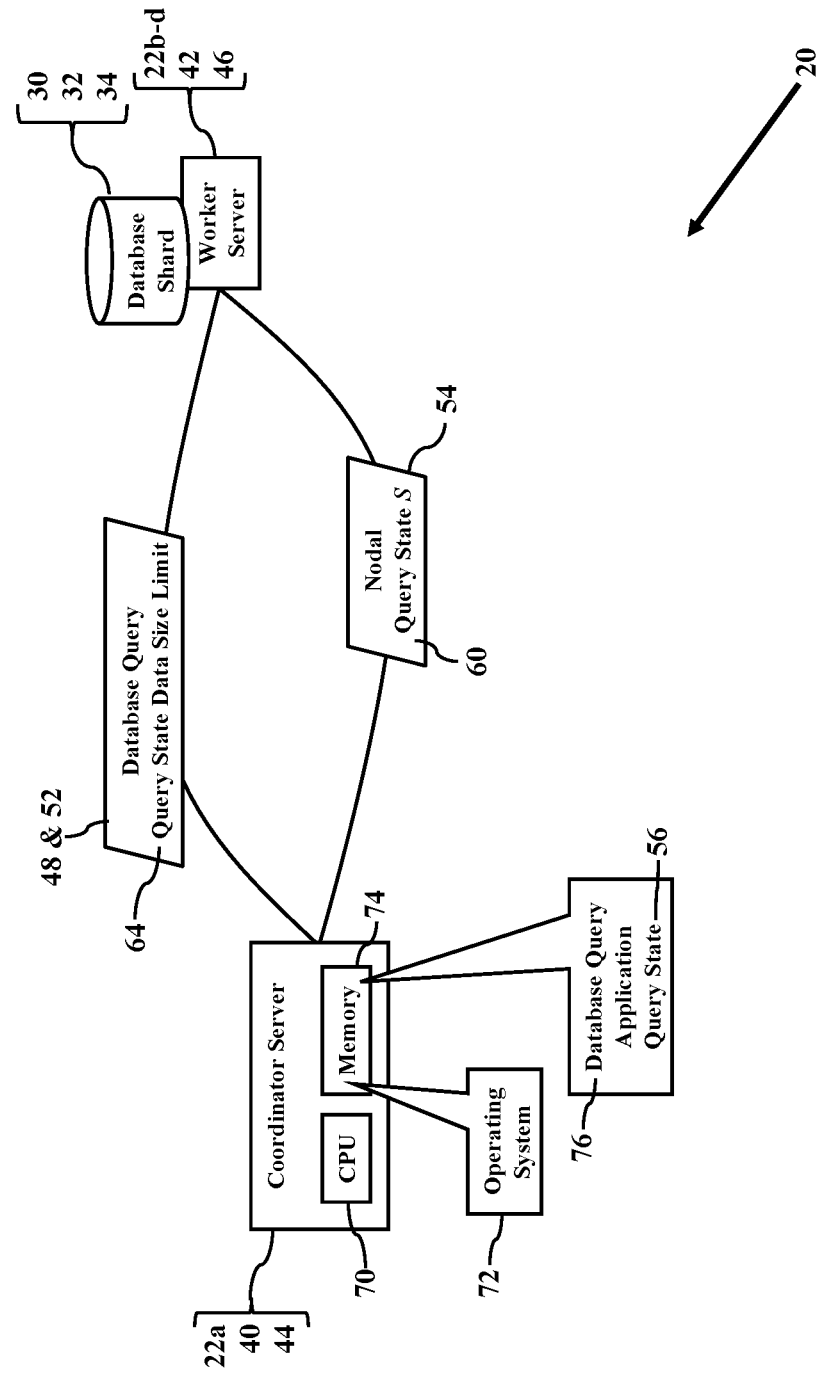
FIGS. 5-6 illustrate a query scheme that improves computer functioning.
Figure 6:
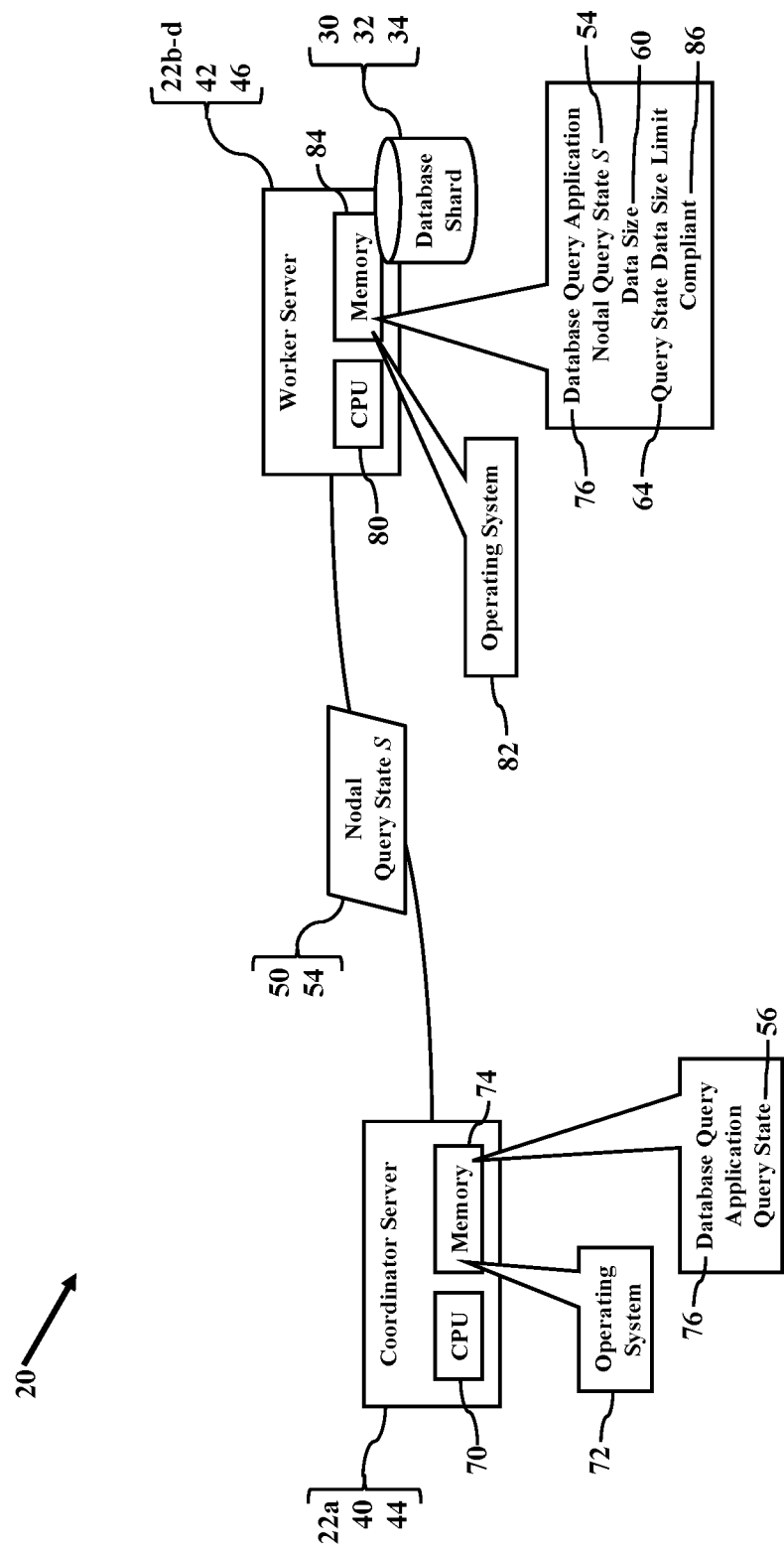

FIGS. 5-6, however, illustrate an elegant query scheme that improves computer functioning. When the coordinator server 44 (performing the coordinator role 40) sends/issues the database query 48 to the worker server 46, the database query 48 may specify a query state data size limit 64. The query state data size limit 64 defines a maximum acceptable bit size for the nodal query state S (illustrated as reference numeral 54) sent from the worker server 46. As FIG. 5 illustrates, the computer system 22a (assigned the coordinator role 40) has a hardware processor (illustrated as CPU) 70 that executes an operating system 72 stored in a memory device 74. FIG. 5 illustrates the computer system 22a as the coordinator server 44, but the computer system 22a may be any processor-controlled device. The coordinator server 44 also stores a coordinator-side version of a database query application 76 in the memory device 74. The coordinator-side version of the database query application 76 may include computer program, code, or instructions that instruct or cause the coordinator server 44 to perform operations, such as querying the worker server 46 for its corresponding nodal query state 54. The coordinator server 44 may send the database query 48 to each worker server 46, and the database query 48 requests the nodal query state 54 associated with the query parameter 52 (as previously explained). The database query 48, however, may also specify the query state data size limit 64 as a query constraint or restriction.

As FIG. 6 illustrates, the worker server 46 may self-determine compliance. When the worker server 46 receives the database query 48 (illustrated in FIG. 5), the worker server 46 may determine whether its individual nodal query state S (illustrated as reference numeral 54) satisfies the query state data size limit 64. The worker server 46 (as-signed the worker role 42) has a hardware processor (illustrated as CPU) 80 that executes an operating system 82 stored in a memory device 84. The worker server 46 also stores and executes a worker-side version of the database query application 76 in the memory device 84. The worker-side version of the database query application 76 cooperates with the coordinator-side version of the database query application 76 to provide map-reduce operations. The worker-side version of the database query application 76 may include computer program, code, or instructions that instruct or cause the hardware processor 80 to perform operations, such as querying its local/remote database shard 32 (according to the query parameter 52) and identifying its corresponding nodal query state 54. The worker-side version of the database query application 76 may also cooperate with the operating system 72 and cause or instruct the hardware processor 80 to determine the data size 60 associated with the nodal query state 54. Once the data size 60 is determined, the worker-side version of the database query application 76 may also cause or instruct the hardware processor 80 to compare the data size 60 to the query state data size limit 64. If the data size 60 (in bits/bytes) is less than or equal to the query state data size limit 64, then the worker-side version of the database query application 76 may determine that the nodal query state S (illustrated as reference numeral 54) is compliant 86 with the query state data size limit 64. Because the nodal query state 54 complies with the query state data size limit 64, the worker-side version of the database query application 76 may be authorized to send the nodal query state 54 to the coordinator server 44. The worker-side version of the database query application 76, for example, may thus instruct the hardware processor 80 to generate the query response 50 that describes, includes, or packages the nodal query state 54. The worker-side version of the database query application 76 then instructs the hardware processor 80 to send the query response 50 and/or nodal query state 54 via the communications network 24 (illustrated in FIG. 1) to the network address (e.g., IP address) associated with the coordinator server 44. When the coordinator server 44 receives the nodal query state 54, the coordinator-side version of the database query application 76 may then generate a partial, overall, or cumulative query result or query state 56 using the compliant nodal query state 54 sent by the worker server 46.

The query state data size limit 64 improves computer functioning. The query state data size limit 64 defines the maximum permissible data size 60 (in bits/bytes) for the nodal query state 54 sent from the worker server 46. Because the query state data size limit 64 constraints or limits the data size 60 associated with the nodal query state 54, the query state data size limit 64 ensures that each worker server's nodal query state 54 will not exceed a threshold value. The query state data size limit 64, in other words, limits consumption of the computer memory device 74 operating in the coordinator server 44. No individual nodal query state 54 can exceed the amount of computer memory allocated to query operations and/or to the protective distributed database service 20. Moreover, the query state data size limit 64 may also constrain the data size 60 associated with the merged partial or overall query state 56. The protective distributed database service 20, by specifying the query state data size limit 64, ensures that each nodal query state 54 remains within memory allocations. The functioning of the coordinator server 44 is improved by reducing memory crashes, query failures, and warnings for insufficient memory.

Figure 7:
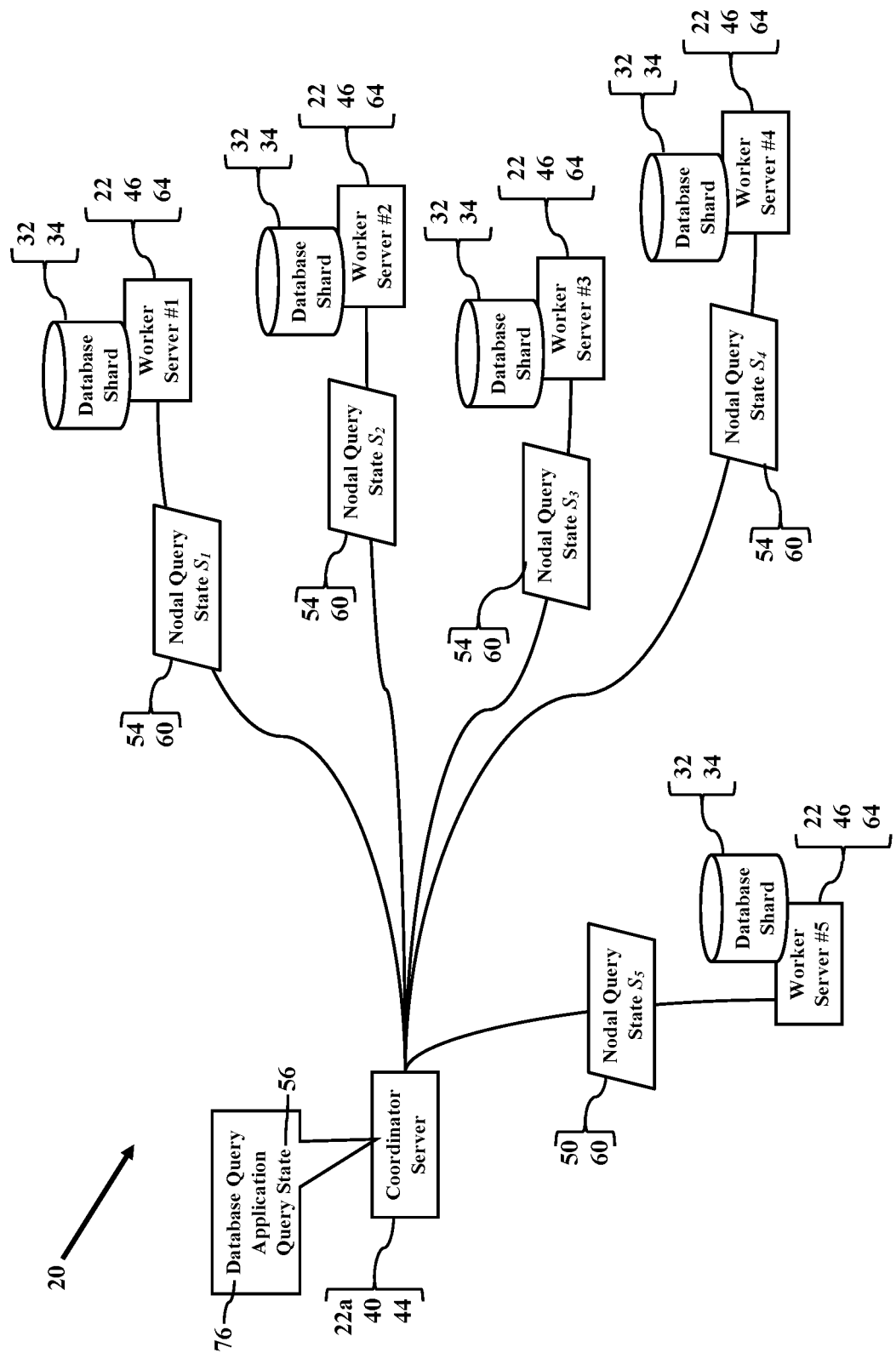
FIG. 7 illustrates examples of compliant query replies.

FIG. 7 illustrates more examples of compliant replies. When all the worker servers 46 respond with compliant nodal query states S (illustrated as reference numeral 54), then the coordinator server 44 may proceed with generating the partial or overall query state 56 representing the distributed database 34. FIG. 7, for simplicity, only illustrates one (1) coordinator server 44 and five (5) worker servers 46. In actual practice, though, many more (or less) computing nodes 26 may be affiliated with the protective distributed database service 20. The coordinator server 44 (assigned the coordinator role 40) queries the worker servers 46 for their corresponding nodal query states $S_{1-5}$ (illustrated as reference numeral 54, and as previously explained with reference to FIGS. 1-6). Each worker server 46 determines the data size 60 associated with its corresponding nodal query state 54. FIG. 7, in particular, illustrates examples in which all the individual nodal query states 54 comply with the query state data size limit 64. Because all the data sizes 60 are less than or equal to the query state data size limit 64, all the worker servers 46 respond to the database query 48 by sending their respective nodal query states 54 to the coordinator server 44.

The coordinator server 44 may confirm responses. When the coordinator server 44 receives any nodal query state 54, the coordinator server 44 may determine or confirm which worker server 46 responded to the database query 48 (illustrated in FIGS. 1-6). As an example, the coordinator-side version of the database query application 76 may match IP addresses between the database query/queries 48 and the nodal query state 54. If every worker server 46, sent the database query 48, also replied with its corresponding nodal query state 54, then the coordinator-side version of the database query application 76 may determine that all the worker servers 46 responded with the nodal query states 54 having the data sizes 60 that satisfied the query state data size limit 64. As another example, the coordinator-side version of the database query application 76 may numerically count the database queries 48 sent to the worker server 46 and numerically count the nodal query states 54 sent by/from the worker servers 46. If the numerical counts equal or match, then the coordinator-side version of the database query application 76 may determine that all the worker servers 46 responded with the nodal query states 54 having the data sizes 60 that satisfied the query state data size limit 64. As yet another example, the coordinator-side version of the database query application 76 may numerically count the worker servers 46 and numerically count the nodal query states 54 sent by/from the worker servers 46. If the numerical counts equal or match, then the coordinator-side version of the database query application 76 may determine that all the worker servers 46 responded with their corresponding nodal query states 54 having the data sizes 60 that satisfied the query state data size limit 64. However the coordinator server 44 determines or confirms that all the worker servers/nodes 46/26 responded with the nodal query states 54 having the data sizes 60 that satisfied the query state data size limit 64, the coordinator server 44 may then generate the query state 56 associated with the distributed database 34. The coordinator-side version of the database query application 76, in general, may merge (e.g., $S_1+S_2+S_3+S_5+S_5$) to equal the query state 56. The coordinator-side version of the database query application 76, in general, combines, merges, and/or joins the different nodal query states 54 having the data sizes 60 that satisfied the query state data size limit 64.

Figure 8:
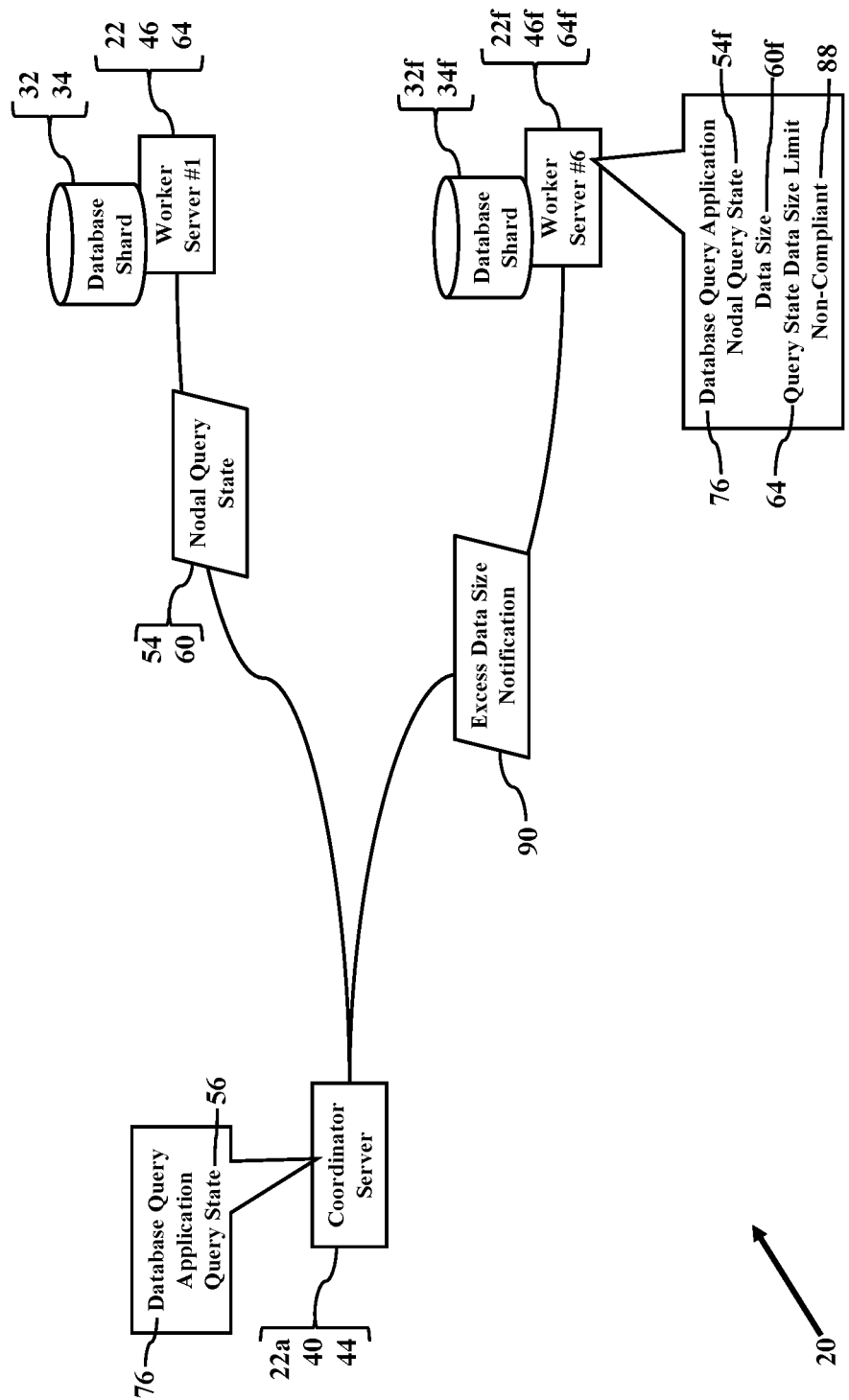
FIG. 8 illustrates examples of non-compliant query replies.

FIG. 8 illustrates examples of non-compliant replies. The coordinator server 44 (assigned the coordinator role 40) queries the worker servers 46 for their corresponding nodal query states 54 (as previously explained with reference to FIGS. 1-6). Each worker server 46 determines the data size 60 associated with its corresponding nodal query state 54. Each worker server 46 compares the data size 60 to the query state data size limit 64. Some nodal query states 54, though, may fail to comply with the query state data size limit 64. In FIG. 8, for example, the worker server/node 46*f* cannot satisfy the query state data size limit 64. That is, the data size 60*f* associated with its nodal query state 54*f* exceeds the query state data size limit 64. The worker-side version of the database query application 76 may thus determine that the data size 60*f* is non-compliant 88. Because the data size 60*f* is non-compliant 88, the worker-side version of the database query application 76 may alert the coordinator server 44 of the non-compliance. While any mechanism may be used, FIG. 8 illustrates an excess data size notification 90. The excess data size notification 90 has any data field, information, content, and/or formatting that indicates the corresponding nodal query state 54 exceeds the query state data size limit 64. The worker-side version of the database query application 76 then causes or instructs the worker server 46 to send the excess data size notification 90 to the network address (e.g., IP address) associated with the coordinator server 44. When the coordinator server 44 receives the excess data size notification 90, the coordinator-side version of the database query application 76 is thus notified or alerted of the non-compliant nodal query state 54 that exceeds the query state data size limit 64. The coordinator-side version of the database query application 76 may further determine that the partial, overall, or cumulative query state 56 is incomplete or indeterminate without the individual contribution of the non-compliant nodal query state 54.

Figure 9:
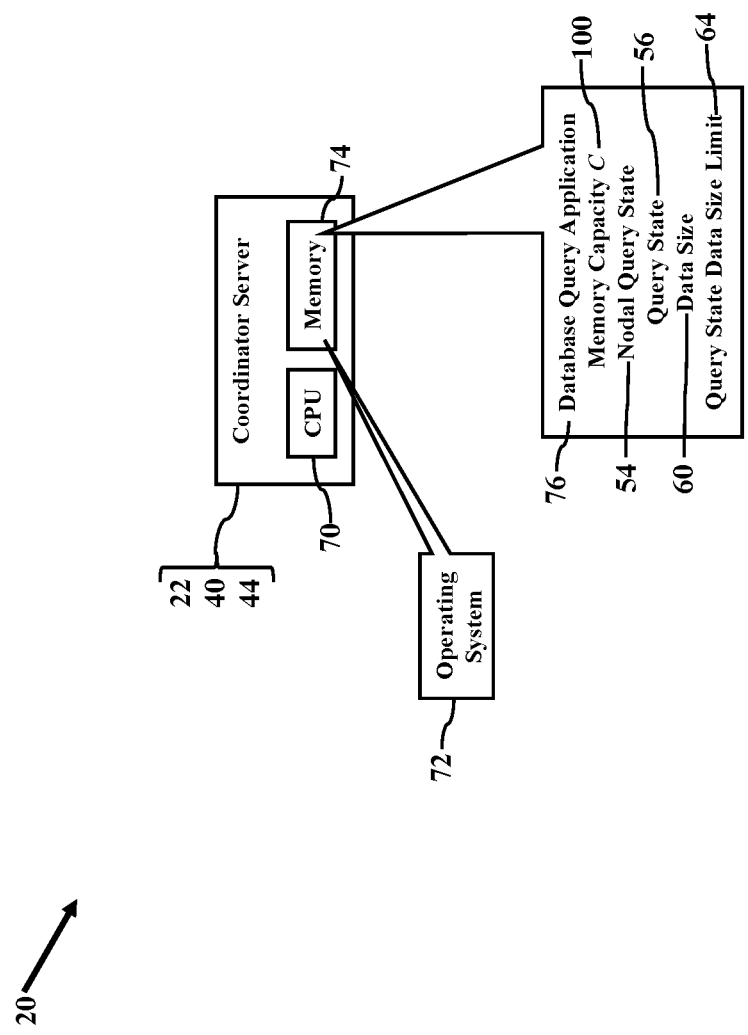
FIG. 9 illustrates examples of constant memory capacity.

FIG. 9 illustrates examples of constant memory capacity. The query state data size limit 64 may be based on a memory space allocated to the protective distributed database service 20 and/or to the coordinator server 44. Suppose, for example, that the coordinator server 44 establishes or configures a portion of the local memory device 74 to be used by the protective distributed database service 20. The local memory device 74 may thus have a memory capacity C (illustrated as reference numeral 100). The memory capacity C may be allocated by the operating system 72 and/or established as a configuration parameter. The memory capacity C may be a portion or partition of any memory device 74 locally and/or remotely available to the distributed database service 20, such as Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology. Wherever and however the memory capacity C (illustrated as reference numeral 100) is established, the memory capacity C restricts or limits, for any reason, a maximum data size 60 associated with the merged query state 56 and/or the data size 60 associated with any one or more individual nodal query states 54. The coordinator-side version of the database query application 76, as another example, cooperates with the operating system 72 to allocate, configure, or establish the memory capacity C.

Figure 10:
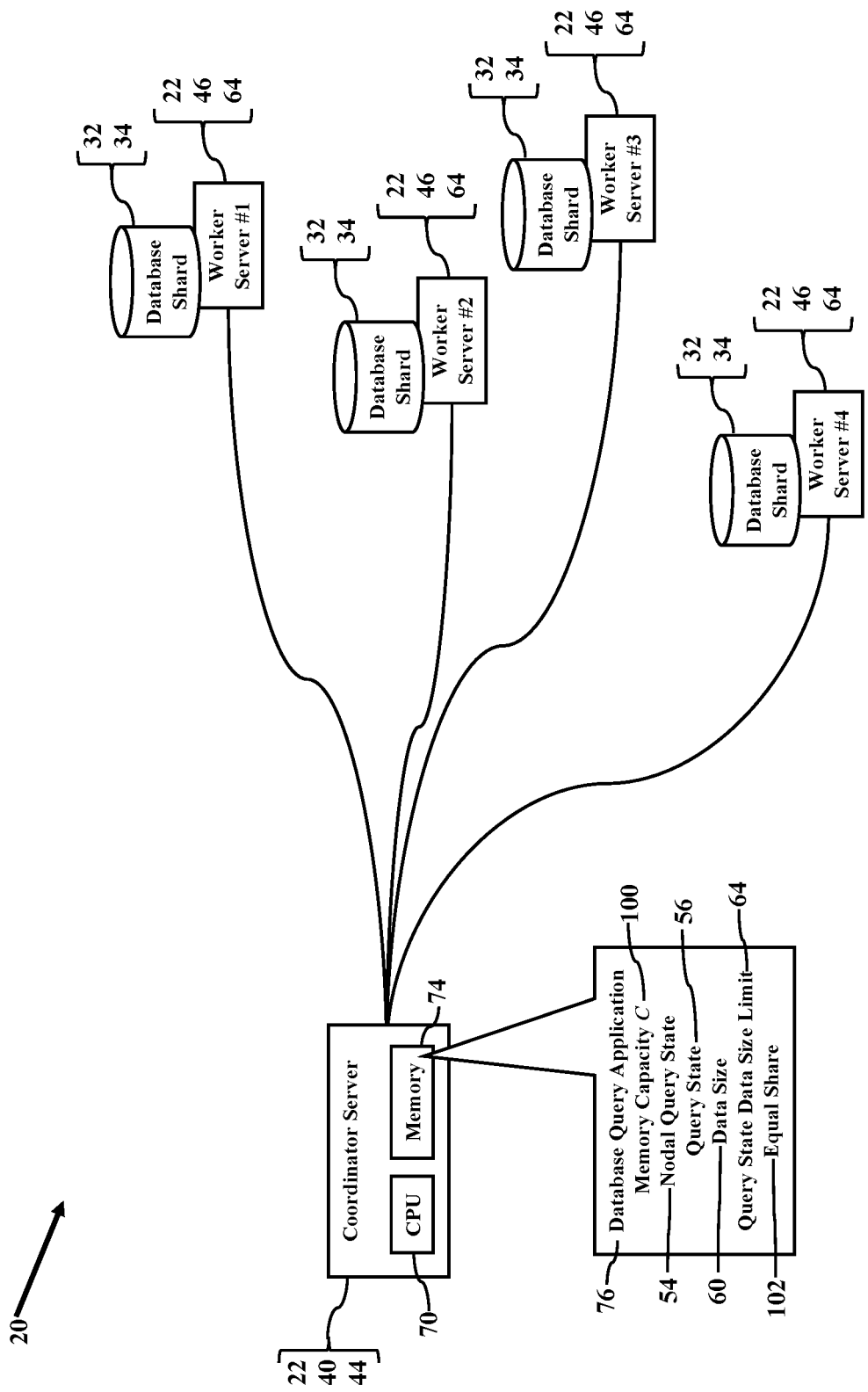
FIGS. 10-12 illustrate examples of a memory sharing mechanism.
Figure 11:
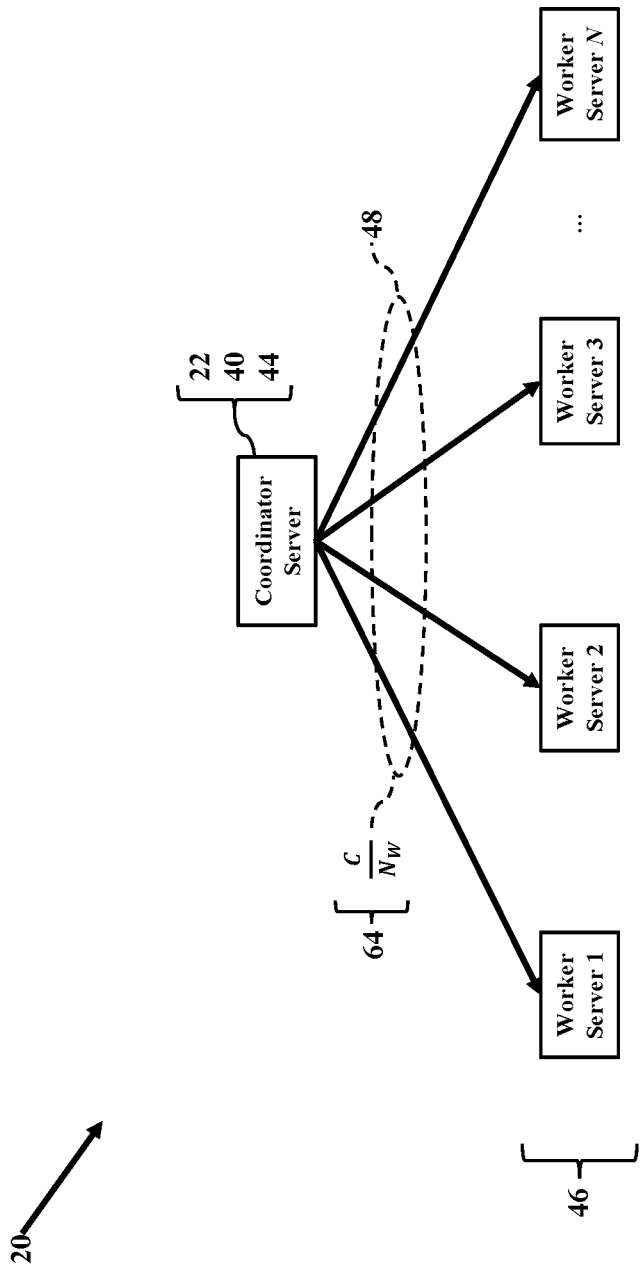
Figure 12:
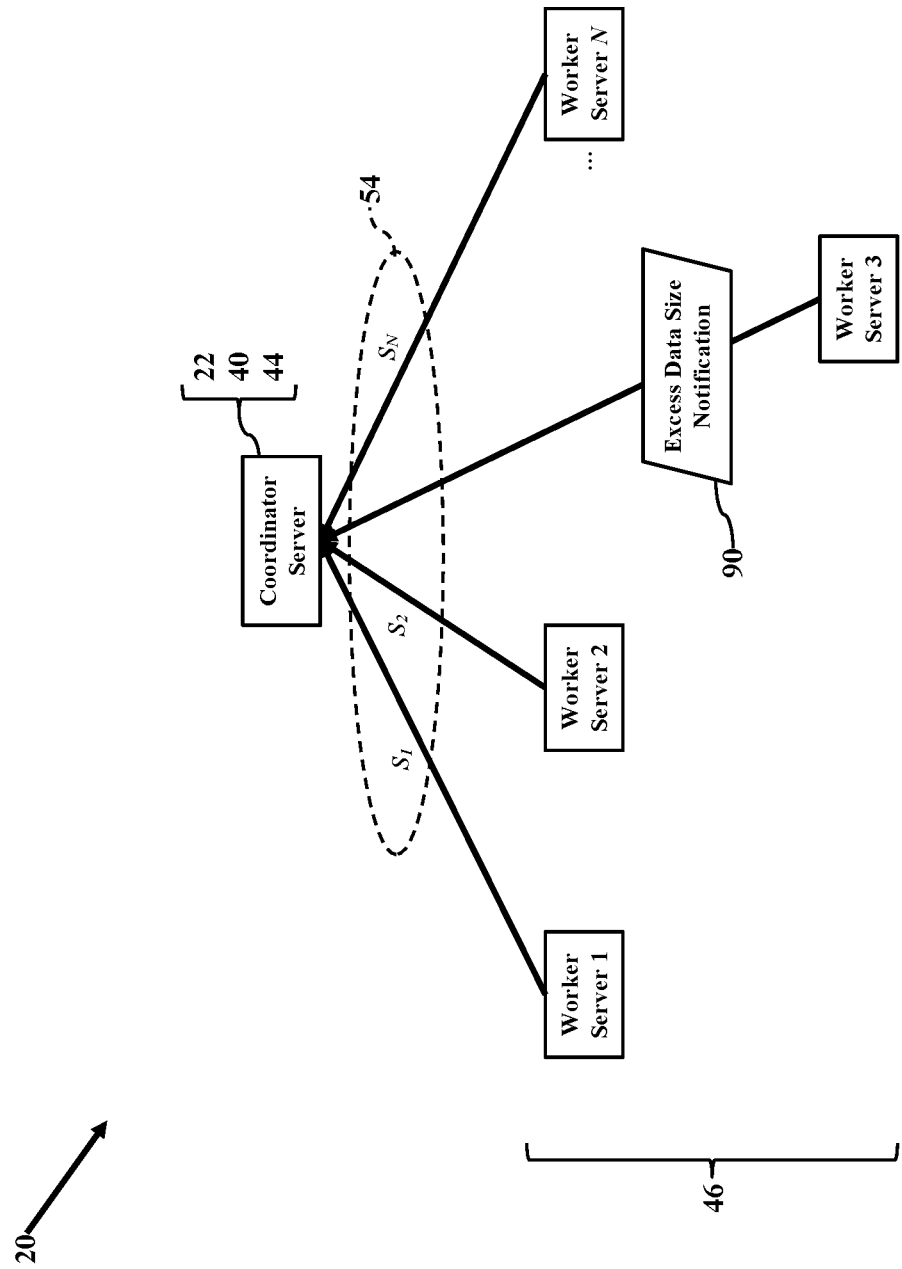

FIGS. 10-12 illustrate examples of an elegant memory sharing mechanism. Once the memory capacity C (illustrated as reference numeral 100) is determined, the distributed database service 20 may then allocate the memory capacity C. While any allocation scheme may be used, suppose the distributed database service 20 allocates the memory capacity C to the cumulative/merged query state 56. Suppose further that the worker servers 46 must equally share the memory capacity C allocated to the cumulative/merged query state 56. That is, the coordinator-side version of the database query application 76 may assign an equal share 102 of the memory capacity C to each worker server 46. The coordinator-side version of the database query application 76 may thus determine the query state data size limit 64 according to $$\text{Query State Data Size Limit} = \frac{C}{N_W},$$

where $N_W$ represents a numerical count, sum, or tally of the worker servers 46 sharing the memory capacity C. Suppose, for example, that the coordinator server 44 allocates four hundred (400) kilobytes of the memory device 74 to the cumulative/merged query state 56. FIGS. 10-11 thus illustrate the coordinator server 44 interfacing with four (4) worker servers 46 that share the memory capacity C. The coordinator-side version of the database query application 76 may assign the equal share 102 of the 400 kilobytes to each worker server 46. The memory capacity C may be horizontally scaled to the worker servers 46. The coordinator-side version of the database query application 76 may thus calculate the query state data size limit 64 as $$\text{Query State Data Size Limit} = \frac{400 \text{ KB}}{4 \text{ Workers}} = 100 \text{ KB/worker}.$$

Each worker server 46, in other words, is allocated the equal share 102 of 100 kilobytes for their respective nodal query state 54. If any worker's nodal query state 54 is less than or equal to the query state data size limit 64 of 100 kilobytes, then the worker server 46 is authorized to report its corresponding nodal query state 54 to the coordinator server 44 (as explained with reference to FIGS. 5-7). As FIG. 12 illustrates, though, if any worker's nodal query state S (reference numeral 54) is greater than the query state data size limit 64 of 100 kilobytes, then the worker server 46 is not authorized to report its corresponding nodal query state 54. The worker server 46, instead, may report a failure, alert, or other non-compliance (such as the excess data size notification 90 explained with reference to FIG. 8). The excess data size notification 90 may even include, indicate, or report the data size 60 associated with the non-compliant nodal query state 54. The worker server 46 may alternatively ignore or fail to reply to the database query 48.

Figure 13:
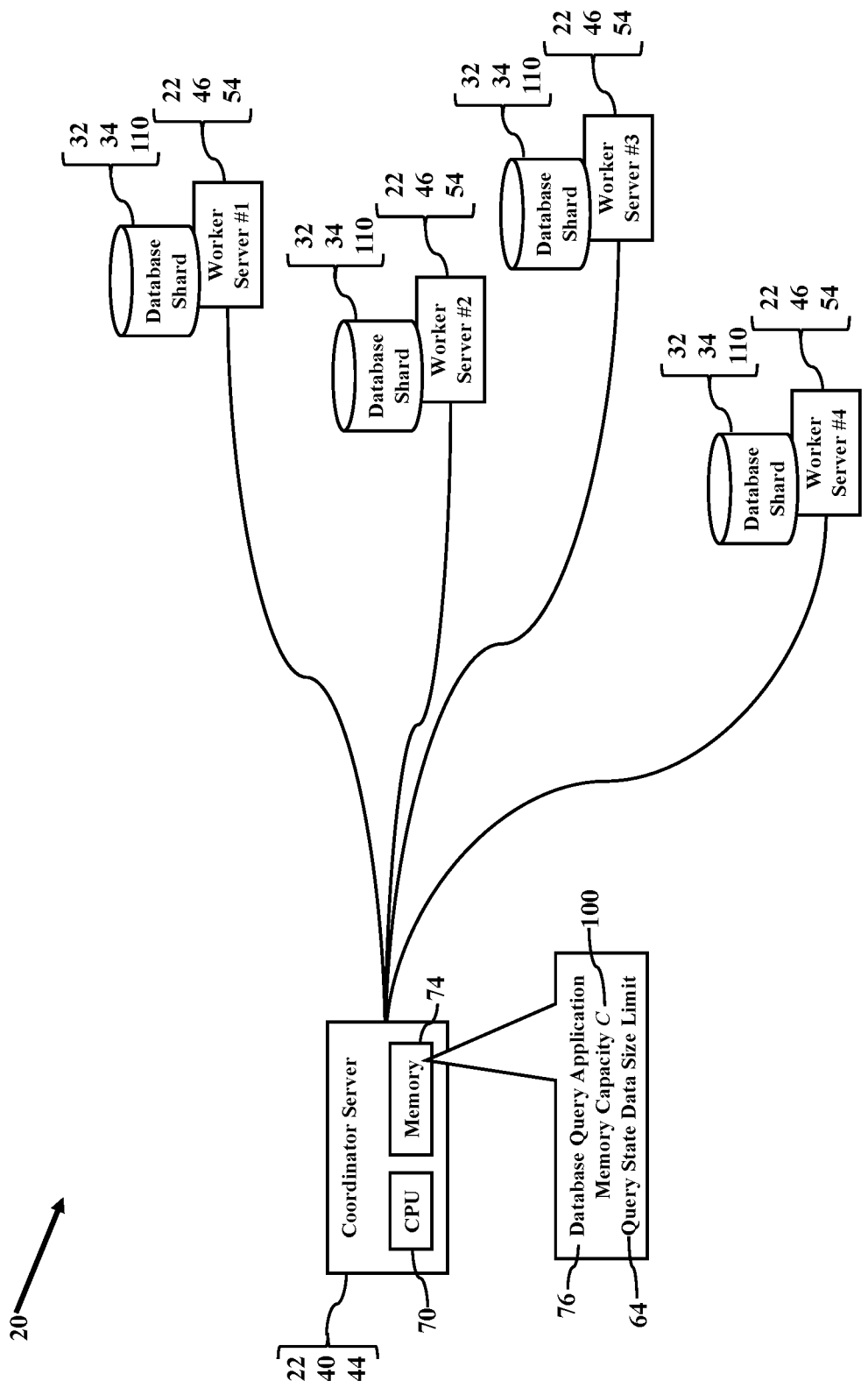
FIGS. 13-16 illustrate more examples of memory sharing.

FIGS. 13-16 illustrate more examples of memory sharing. Once the memory capacity C (illustrated as reference numeral 100) is determined, the distributed database service 20 may then unequally allocate the memory capacity C among the worker servers 46. One or more worker servers 46, in other words, may utilize or consume a greater share or portion of the memory capacity C. Other worker servers 46, concomitantly, utilize or consume a smaller share or portion of the memory capacity C. FIG. 13, for example, illustrates the query state data size limit 64 being related to the bit size 110 of the worker's corresponding database shard 32. Perhaps those worker servers 46 storing bigger/larger database shards 32 deserve a higher query state data size limit 64. Conversely, perhaps worker servers 46 storing smaller database shards 32 deserve a smaller query state data size limit 64. The coordinator-side version of the database query application 76 may thus inventory each worker server 46 for the bit size 110 of its corresponding database shard 32. The coordinator-side version of the database query application 76 may assign the query state data size limit 64 based on the bit size 110 of the database shard 32. Each worker's query state data size limit 64 may be proportionate to the bit size 110 of its corresponding database shard 32. Still, though, each different query state data size limit 64 may still be imposed to protect the memory capacity C of the coordinator server 44.

Figure 14:
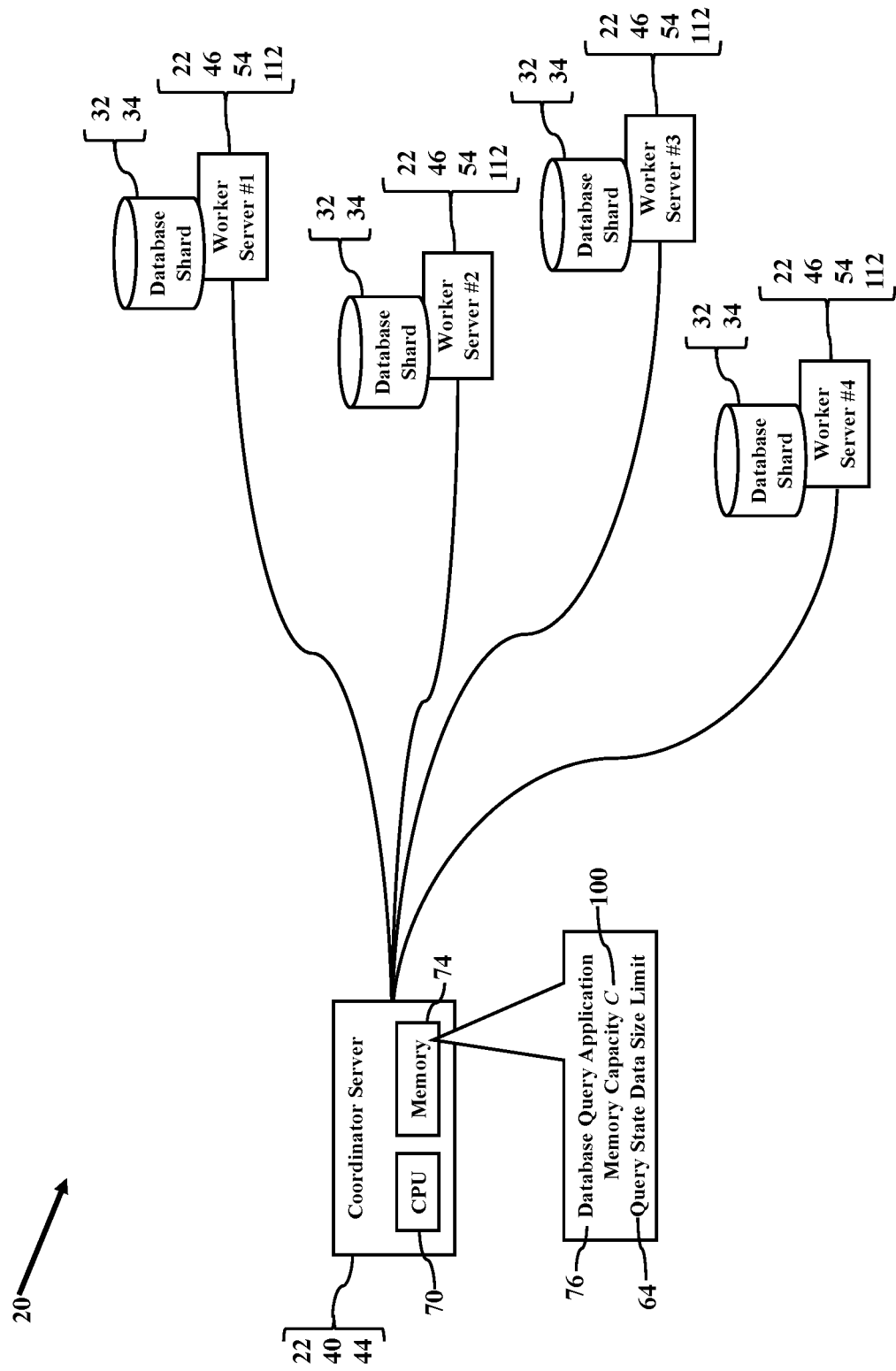

FIG. 14 illustrates workload considerations. The coordinator-side version of the database query application 76 may assign the query state data size limit 64 based on the worker's workload 112. One or more worker servers 46 may have a higher/greater workload 112 (such as hardware/software computing resources) and perhaps utilize or consume a corresponding greater share or portion of the memory capacity C (illustrated as reference numeral 100). Other worker servers 46, though, may have a lower/smaller workload 112 and perhaps utilize or consume a corresponding smaller share or portion of the memory capacity C. The coordinator-side version of the database query application 76 may thus inventory each worker server 46 for its corresponding workload 112. The coordinator-side version of the database query application 76 may assign the query state data size limit 64 based on the workload 112. Each worker's query state data size limit 64 may be proportionate to its corresponding workload 112. Still, though, each different query state data size limit 64 may still be imposed to protect the memory capacity C of the coordinator server 44.

Figure 15:
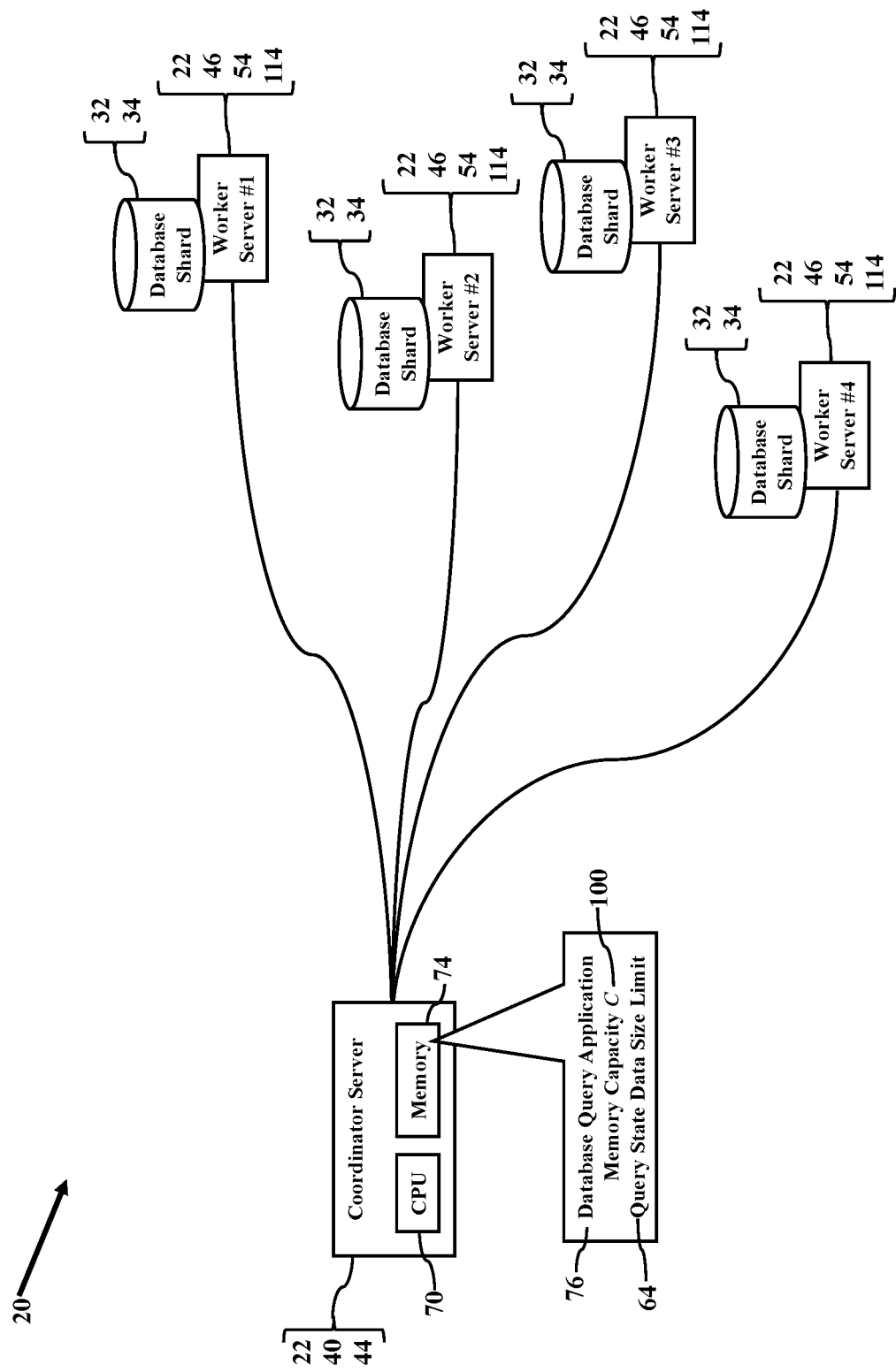

FIG. 15 illustrates performance-based metrics 114. The highest or best performing computer machines may be assigned the most resource-intensive database processing tasks. Lower performing computer machines, in contrast, may be assigned less burdensome database processing tasks. The coordinator-side version of the database query application 76 may thus assign the query state data size limit 64 based on one or more hardware and/or software performance metrics 114. The coordinator-side version of the database query application 76 may thus assign the query state data size limit 64 based on speed/cycles/cores associated with the worker's corresponding hardware processor 80 (illustrated in FIG. 6). The coordinator-side version of the database query application 76 may additionally or alternatively assign the query state data size limit 64 based on speed/cycles/size associated with the worker's corresponding hardware memory device 84 (illustrated in FIG. 5). The coordinator-side version of the database query application 76 may additionally or alternatively assign the query state data size limit 64 based on software applications and versions available to, or executable by, the worker server 46. The coordinator-side version of the database query application 76 may thus inventory each worker server's hardware and software capabilities and assign the query state data size limit 64 as a portion of the memory capacity C (illustrated as reference numeral 100) based on any hardware and/or software performance metric 114.

Figure 16:
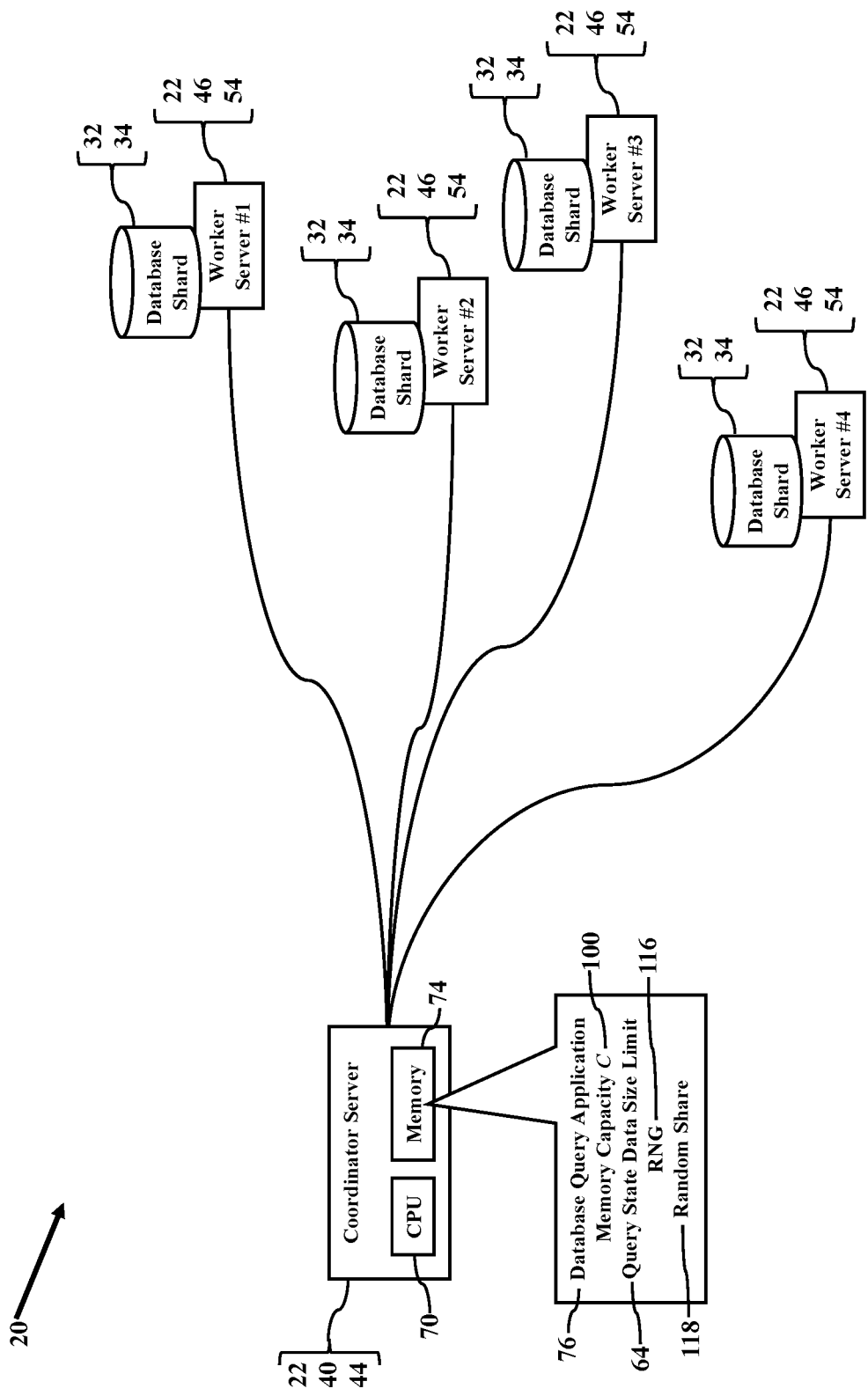

FIG. 16 illustrates a random sharing scheme. The coordinator-side version of the database query application 76 may randomly assign the query state data size limit 64. The coordinator-side version of the database query application 76 may call or invoke a random number generator (or RNG) 116 to determine random shares 118 of the memory capacity C (illustrated as reference numeral 100) assigned to any worker server 46. The coordinator-side version of the database query application 76 may thus assign random values of the query state data size limit 64 to any worker server 46, provided that the sum total of the random query state file size limits 64 cannot exceed the memory capacity C.

Figure 17:
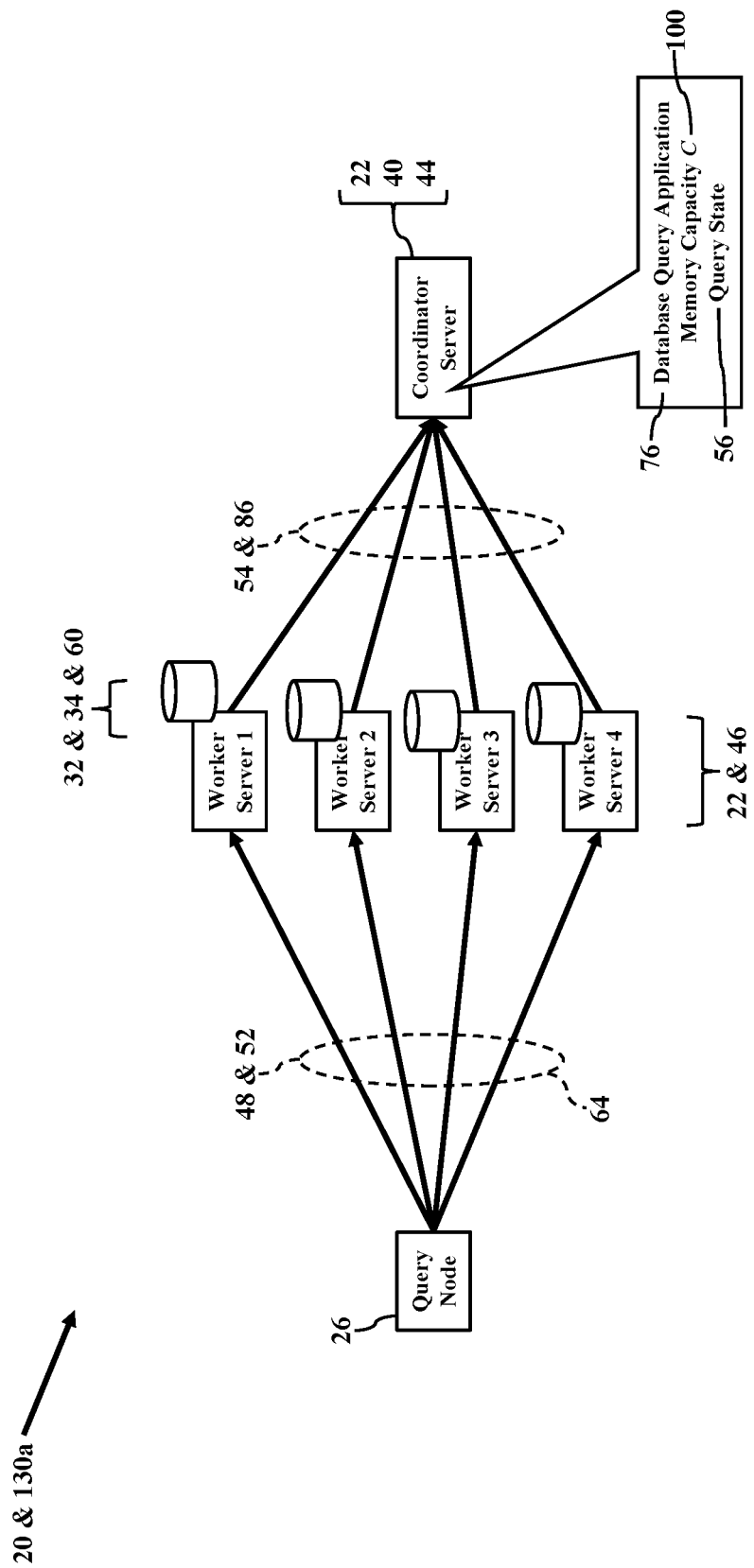
FIGS. 17-19 illustrate examples of a memory-sharing polling mechanism.
Figure 18:
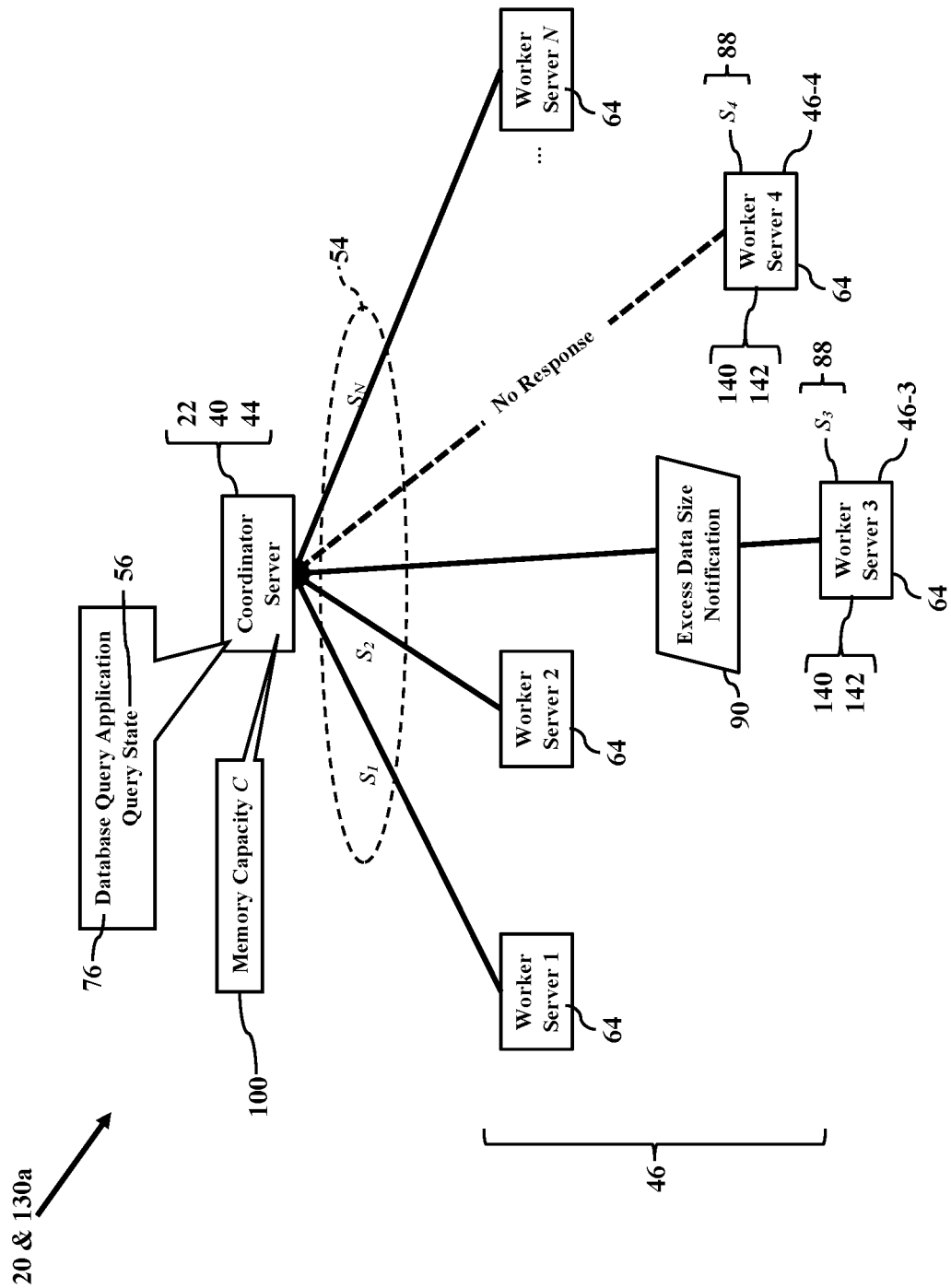
Figure 19:
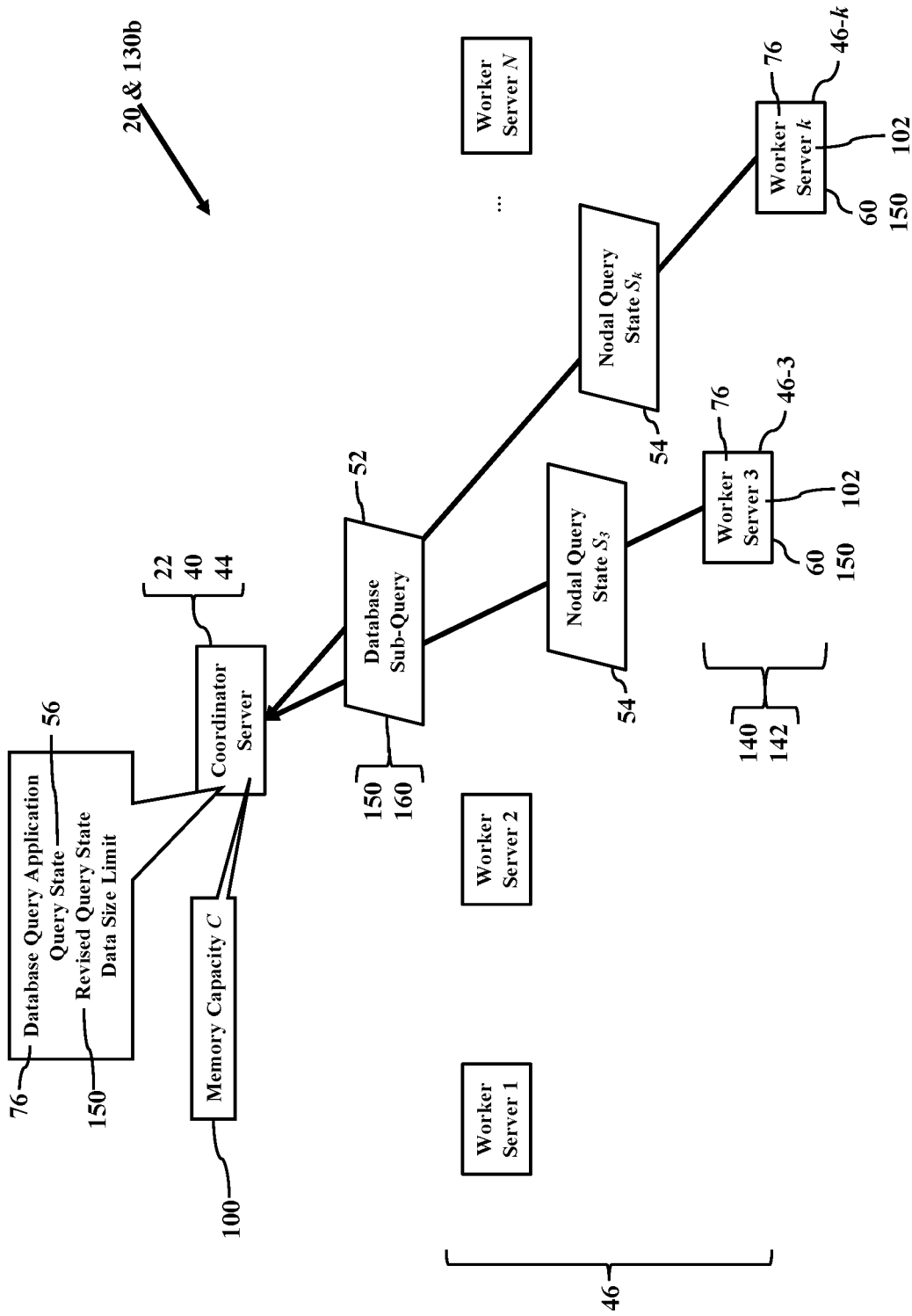

FIGS. 17-19 illustrate examples of an elegant memory-sharing polling mechanism 130. One or more successive polling cycles 130 may be conducted to obtain the nodal query states 54 from the worker servers 46. As FIG. 17 illustrates, the database query 48 may originate from any network location (again illustrated as the query node 26). The query state data size limit 64, though, may further vary or change according the number of the worker servers 46 being polled during each polling cycle 130. FIG. 17, for example, illustrates a first or initial polling cycle 130a that interrogates the worker servers 46 for their corresponding nodal query states 54. While the polling cycles 130 may use any information retrieval scheme, FIG. 17, for simplicity, again illustrates the database queries 48 sent from the query source (e.g., the query node 26). The database query 48 is sent to each worker server 46 storing any of the database shards 32 representing or associated with the distributed database 34. The database query 48 may specify the query parameter(s) 52 and/or the query state data size limit 64. Multiple copies of the database query 48 may be sent in parallel to the worker servers 46, or the database query 48 may be sequentially/round-robin/randomly sent to the worker servers 46. However the database query/queries 48 is/are sent, the coordinator-side version of the database query application 76 may cause or instruct the coordinator server 44 to await a response from each worker server 46 (perhaps within some responsive time limit).

Each worker server 46 may execute the database query 48. When any worker server 46 receives the database query 48, the worker server 46 executes the database query 48 on its database shard 32 and determines the data size 60 associated with its corresponding nodal query state 54. If the data size 60 of the nodal query state 54 satisfies (e.g., less than or equal to) the query state data size limit 64, then the coordinator-side version of the database query application 76 may instruct or cause the corresponding worker server 46 to affirmatively respond to the database query 48. That is, because the nodal query state 54 is compliant 86 with the query state data size limit 64, the worker server 46 is authorized to send the corresponding nodal query state 54 to the coordinator server 44 (such as previously explained with reference to FIGS. 5-7). If, however, the data size 60 of the nodal query state 54 exceeds the query state data size limit 64, then the nodal query state 54 is non-compliant 88 and the worker server 46 may alert the coordinator server 44. Again, while any alert mechanism may be used, the worker-side version of the database query application 76 may cause or instruct the worker server 46 to generate and to send the excess data size notification 90 to the coordinator server 44 (such as previously explained with reference to FIG. 8). The coordinator-side version of the database query application 76 may thus quickly and easily determine which worker servers 46 have compliant and non-compliant nodal query states 54.

The first polling cycle 130a may be sufficient. Should all the worker servers 46 respond with compliant nodal query states 54, then the coordinator server 44 may proceed with generating the partial or overall query state 56 representing the distributed database 34. Because all the individual nodal query states 54 comply with the query state data size limit 64, the coordinator-side version of the database query application 76 may generate the partial, entire or total query state 56 associated with the distributed database 34. The coordinator-side version of the database query application 76, in general, executes map-reduce operations that combine, merge, aggregate, and/or join the different nodal query states 54 (such as previously explained with reference to FIGS. 4-6).

The memory capacity C may be reused. If all the individual nodal query states 54 comply with the query state data size limit 64, then the first polling cycle 130a may be sufficient. The coordinator-side version of the database query application 76 generates the partial or entire query state 56 associated with the distributed database 34, perhaps by combining, merging, and/or joining the different nodal query states 54. The coordinator-side version of the database query application 76 may also clear, delete, or transfer the nodal query states 54 from the memory capacity C (illustrated as reference numeral 100). The coordinator-side version of the database query application 76 may thus free-up and reset the memory capacity C, thus making the memory capacity C reusable for additional or different database queries.

As FIG. 18 illustrates, though, some individual nodal query states 54 are non-compliant 88. Some worker servers 46 can comply with the query state data size limit 64 and thus send their respective nodal query states 54. Some worker servers (such as 46-3 and 46-4), though, cannot comply with the query state data size limit 64. Some worker servers (such as 46-3) may indicate its non-compliant nodal query state 54 by sending the excess data size notification 90. Other worker servers (such as 46-4) may indicate its non-compliant nodal query state 54 by not responding to the database query 48 (illustrated in FIG. 17). Because at least one (1) of the nodal query states 54 is non-compliant 88, the coordinator-side version of the database query application 76 may therefore decline to generate the overall or cumulative query result or query state 56. In simple words, because at least one (1) of the nodal query states 54 is missing, the aggregate query state 56 would be inaccurate. Any merger/join operation that excludes the non-compliant nodal query state(s) 54 would not accurately reflect the total query state 56 of the entire electronic database 32.

The coordinator server 44 may identify residual nodes 140. The coordinator-side version of the database query application 76 may identify a subset 142 of the worker servers/nodes 46/26 whose nodal query states 54 exceed the query state byte limit 64. These residual worker servers or nodes 140 remain after the first polling cycle 130a, as their respective nodal query states 54 failed to comply with the query state byte limit 64. The residual nodes 140 may be identified by the sending IP address associated with the excess data size notification 90. The residual nodes 140 may also be determined by matching the IP addresses of the worker servers 46 to the compliant nodal query states 54, thus identifying the residual nodes 140 that failed to send their respective nodal query states 54. However the residual nodes 140 are identified, the coordinator-side version of the database query application 76 determines which nodal query states 54 are missing from which worker servers/nodes 46/26.

As FIG. 19 illustrates, additional polling cycles 130 may be desired. Once each worker server 46 has responded (or failed to respond) to the initial polling cycle 130a (such as by sending the compliant corresponding nodal query state 54, or by sending the excess data size notification 90, or by no response to the database query 48), the coordinator-side version of the database query application 76 may determine that a second/subsequent polling cycle 130b is desired. Because at least one (1) of the nodal query states 54 is missing, the coordinator-side version of the database query application 76 may conduct another round of polling to retrieve missing nodal query states 54. However, because at least one (1) of the worker servers 46 responded to the first polling cycle 130a with its compliant nodal query state 54, there is no need to re-poll those same worker servers 46. Some database queries 48, however, need not be necessarily resubmitted, such as, for instance, any database query 48 still running on any worker node 46 (e.g., because the worker node 46 did not finish execution before the current poll round 130a). The coordinator-side version of the database query application 76 may thus decline to send the same database query 48 (specifying the same query parameter 52) to the worker servers 46 having already provided their compliant nodal query states 54.

The coordinator server 44 may free-up the memory capacity C. Prior to conducting the second polling cycle 130b, the coordinator-side version of the database query application 76 may also clear, delete, or transfer the compliant nodal query states 54 from the memory capacity C (illustrated as reference numeral 100). The coordinator-side version of the database query application 76 may move the compliant nodal query states 54 to some other portion of the memory device 74 and/or to any remote storage or other networked location. The coordinator-side version of the database query application 76 may thus free-up the memory capacity C allocated to the distributed database service 20. The memory capacity C may thus be cleared and reused, thus devoting its bit capacity to the second polling cycle 130b.

The coordinator server 44 may also generate a revised query state file size limit 150. Once the memory capacity C (illustrated as reference numeral 100) is freed, the coordinator-side version of the database query application 76 may re-allocate the memory capacity C among the residual nodes 140 having yet to submit their nodal query states 54. FIG. 19, for simplicity, again illustrates the equal share 102 assigned to each residual node 140 of the subset 142. Here, though, the coordinator-side version of the database query application 76 may determine the updated or revised query state file size limit 150 based on the residual nodes 140 having yet to submit their nodal query states 54. The memory capacity C may thus be equally shared among the residual nodes 140 according to $$\text{Revised Query State Data Size Limit} = \frac{C}{N_k},$$

where $N_k$ is a numerical count, sum, or tally of the residual nodes 140 in the subset 142 that have not yet submitted their nodal query states 54. The numerical count of the residual nodes 140 (having yet to send their nodal query states 54) may also be determined by a numerical count of the compliant nodal query states 54. The updated or revised query state file size limit 150 may alternatively be determined as $$\text{Revised Query State Data Size Limit} = \frac{C}{(N_W - N_S)},$$

where $N_S$ is a numerical count, sum, or tally of the worker nodes 46 that have sent their nodal query states 54 and/or a numerical count of the nodal query states 54 that have been merged. $N_k$, in other words, may be determined by $$N_k = N_W - N_S.$$

The numerical count $N_k$ of the residual nodes 140 (to be queried during any polling cycle 130) may be determined by tracking or monitoring those worker servers 46 having supplied their complaint nodal query states 54. So, FIG. 19 again illustrates the example in which the coordinator server 44 re-allocates four hundred (400) kilobytes of the memory device 74 among two (2) residual nodes 140 not providing their nodal query states 54 (for whatever reason) during the first polling cycle 130a. The coordinator-side version of the database query application 76 may thus calculate the revised query state file size limit 150 as $$\text{Revised Query State Data Size Limit} = \frac{400\,\text{KB}}{2\,\text{Workers}} = 200\,\text{KB/worker}.$$

During the second/subsequent polling cycle 130b, each residual node 140 may be allocated the equal share 102 of 200 kilobytes for its respective nodal query state 54.

A database sub-query 160 may be sent. Once the revised query state file size limit 150 is determined, the second/subsequent polling cycle 130b is conducted. Again, while any nodal member or network resource may query the residual nodes 140, FIG. 19 again illustrates the coordinator server 44. The coordinator-side version of the database query application 76 instructs or causes the coordinator server 44 to generate and send the sub-query 160 to each worker server 46 in the subset 142 (identified as the residual node 140). The sub-query 160 may (or may not) specify the same query parameter(s) 52, but the sub-query 160 specifies the revised query state file size limit 150. Multiple copies of the sub-query 160 may be sent in parallel to the residual nodes 140, or the sub-query 160 may be sequentially/round-robin/randomly sent to the residual nodes 140. Each sub-query 160 may typically specify the full memory capacity C as the revised query state file size limit 150. Any sub-query 160, though, may alternatively specify a lower/smaller revised query state file size limit 150 than the full memory capacity C.

Each residual node 140 may self-determine compliance. When the worker server (e.g., 46-3 and 46-k) in the subset 142 receives the sub-query 160, the worker server 46 may determine whether its individual nodal query state 54 satisfies the revised query state file size limit 150. The worker-side version of the database query application 76 determines the data size 60 associated with its nodal query state 54 and compares the data size 60 to the revised query state file size limit 150. If the data size 60 (in bits/bytes) is less than or equal to the revised query state file size limit 150, then the worker-side version of the database query application 76 may determine that the nodal query state 54 is now compliant 86 with the revised query state file size limit 150 and send the nodal query state 54 to the coordinator server 44.

If, however, the data size 60 is greater than the revised query state file size limit 150 (e.g., 200 kilobytes), then the nodal query state 54 remains non-compliant 88.

As may now be understood, polling rounds may continue. Whenever the coordinator server 44 determines that any nodal query state 54 is non-compliant 88 and/or missing, the coordinator server 44 may continue with still more subsequent polling cycles 130. The coordinator-side version of the database query application 76 may cyclically i) identify the residual nodes 140 whose nodal query states 54 exceed the revised query state file size limit 150, ii) clear or free-up the memory capacity C (illustrated as reference numeral 100), iii) generate yet another revised query state file size limit 150 based on the worker servers/nodes 46/26 (e.g., the residual nodes 140) whose nodal query states 54 remain non-compliant 88 or missing, and iv) conduct third, fourth, or more polling cycles 130. Polling may eventually end when the coordinator server 44 retrieves all the nodal query states 54 that have the data size 60 less than or equal to the memory capacity C (illustrated as reference numeral 100).

The coordinator server 44 may thus never run out of memory. Whatever the memory capacity C (illustrated as reference numeral 100), the query state file size limits 64 and/or 150 ensure that the memory capacity C is divided between the worker servers 46 or the residual nodes 140. No single nodal query state 54 can be retrieved that exceeds the query state file size limits 64 and/or 150. The memory capacity C is protected by constraining the nodal query states 54 to only those compliant with the limits 64 and/or 150.

The memory capacity C need not be equally shared. As this disclosure previously explained, the distributed database service 20 may equally, or unequally, allocate the memory capacity C during any polling cycle 130. Configuring the distributed database service 20 to implement the equal shares 102 is perhaps easiest to explain. However, any of the residual nodes 140 being polled may utilize or consume a greater/lesser share or portion of the memory capacity C (illustrated as reference numeral 100). Any polling cycle 130 may allocate the memory capacity C according to the bit size 110 of the worker's corresponding database shard 32 (as explained with reference to FIG. 13). Any polling cycle 130 may allocate the memory capacity C according to the worker's workload 112 (as explained with reference to FIG. 14). Any polling cycle 130 may allocate the memory capacity C according to the performance-based metrics 114 (as explained with reference to FIG. 15). Any polling cycle 130 may randomly allocate the memory capacity C (as explained with reference to FIG. 16). The coordinator-side version of the database query application 76 may implement any memory sharing scheme for any polling cycle 130, thus perhaps dynamically changing worker allocations to suit any performance or policy objective.

However the memory capacity C is shared, the distributed database service 20 may be greedy. Even though the memory capacity C (illustrated as reference numeral 100) may be allocated to the distributed database service 20, the coordinator-side version of the database query application 76 may be configured to consume or take all of the memory capacity C during each round of the polling cycles 130. The coordinator-side version of the database query application 76, in other words, may be greedy in its consumption of the memory capacity C. The coordinator-side version of the database query application 76 takes or consumes its full memory resources in each rounding of polling. The coordinator-side version of the database query application 76 may then update the limits 64/150 and again greedily consume the full memory capacity C in the next round. So, if the nodal query state S (illustrated as reference numeral 54) is less than or equal to the query state data size limit 64, then the distributed database service 20 accepts the compliant nodal query state 54. The coordinator-side version of the database query application 76 may then nearly immediately merge the compliant nodal query state 54 to at least partially generate the total query state 56. If, however, the nodal query state S exceeds the query state data size limit 64, then the coordinator-side version of the database query application 76 updates and determines the revised query state file size limit 150. Because at least some worker servers 46 provided their nodal query states 54, the memory capacity C can intake more state, as less workers are sending their nodal query states 54. The coordinator-side version of the database query application 76 may thus implement a greedy approach by taking as much state as possible during each polling cycle 130.

The query state file size limits 64 and 150 may thus have a correlation to the number of worker nodes 46 remaining in the round. The memory capacity C (illustrated as reference numeral 100) may be initially divided by the number $N_w$ of nodes 26 or worker servers 46 in the cluster 28. The total bit size of all the nodal query states 54 can thus never exceed the memory capacity C. Similarly, the total bit size of all the remaining nodal query states 54 sent from the residual nodes 140 can never exceed the memory capacity C. The distributed database service 20 may thus bind the memory capacity C to the number of worker servers 46 or residual nodes 140 in each polling cycle 130. The query state file size limits 64 and 150 thus acts as memory insurance that the coordinator server 44 will never crash for insufficient memory. As the nodal query states 54 are resolved during each polling cycle 130, the memory share allocation to each server/node 46/26 may increase. The memory capacity C is thus bound to the number of worker servers 46 or residual nodes 140 having yet to send their nodal query states 54. The query state data size limit 64 may thus initially have a smallest value during the first polling cycle 130a, as the numerical count of the worker servers 46 is largest. However, if at least one (1) nodal query state 54 is retrieved during the first polling cycle 130a, then the numerical count of the worker servers 46 will decrease for the second polling cycle 130b. The memory capacity C will thus be shared by a smaller number of worker servers 46 or residual nodes 140 having yet to send their nodal query states 54. The revised query state file size limit 150 will thus be larger than the initial query state data size limit 64, as there are fewer worker servers 46 having yet to supply their nodal query states 54. Indeed, with each successive polling cycle 130, the count of the residual nodes 140 will decrease, and the value of each successive revised query state file size limit 150 will progressively increase. Effectively, then, the smallest nodal query states 54 are initially retrieved, and each successive polling cycle 130 obtains larger and larger nodal query states 54.

Figure 20:
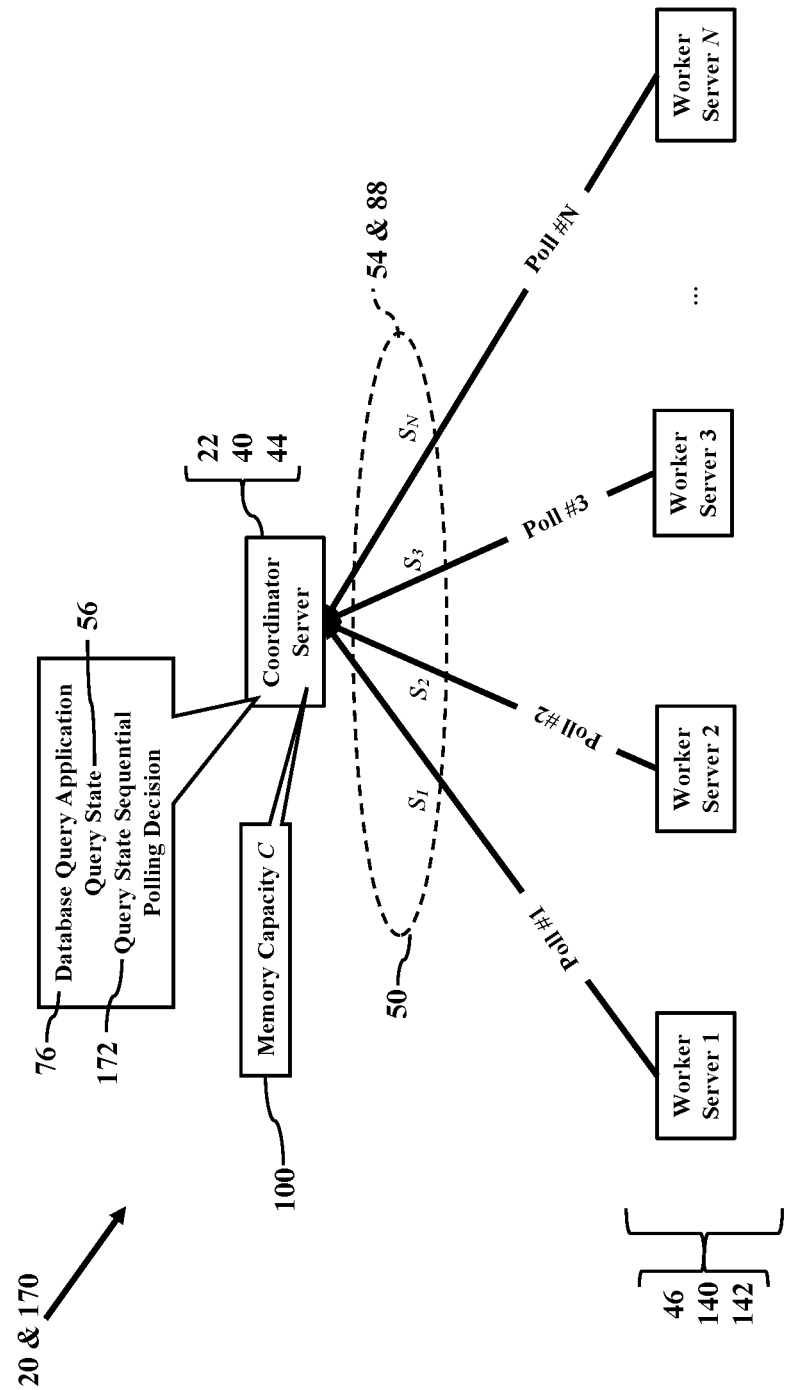
FIG. 20 illustrates examples of sequential polling.

FIG. 20 illustrates examples of sequential polling 170. Each polling cycle 130 (as explained with reference to FIGS. 17-19) requires time to retrieve the compliant nodal query states 54. Each polling cycle 130 requires more time to identify the residual nodes 140 that remain and that may be repolled. Each polling cycle 130 further adds packet traffic to the communications network 24 (illustrated in FIG. 1), consumes hardware and software resources, and consumes electrical power. Each polling cycle 130 thus has associated costs. Moreover, as each successive polling cycle 130 reduces the number of the residual nodes 140, the memory capacity C (illustrated as reference numeral 100) is likely shared by fewer and fewer nodes 26. Each successive polling cycle 130, in other words, may allocate a greater share to the remaining residual nodes 140. At some point, then, the coordinator server 44 may limit the number of the polling cycles 130 to reduce costs and/or to improve performance. The coordinator server 44, for example, may dynamically switch between parallel polling (such as 130*a-b*) and the sequential polling 170, depending on any cost or performance criterion.

FIG. 20, for example, illustrates a query state sequential polling decision 172. For simplicity, FIG. 20 again illustrates the coordinator server 44 polling the worker servers 46 and monitoring for their query responses 50. If none of the worker servers 46 respond during any polling cycle 130 (illustrated in FIGS. 17-19), and/or if all nodes 26 send the excess data size notification 90 (as explained with reference to FIG. 18), then the coordinator-side version of the database query application 76 may assume that all the nodal query states 54 are non-compliant 88. That is, regardless of the query state byte limit 64 or the revised query state file size limit 150 or the polling cycle 130, if no nodal query states 54 are received, then the coordinator server 44 may determine that all the nodal query states 54 are non-compliant 88. The coordinator-side version of the database query application 76 may thus be configured to implement the query state sequential polling decision 172 that switches or changes from parallel polling to the sequential polling 170 of the worker servers 46. The coordinator-side version of the database query application 76, in other words, may revert to the sequential polling 170, as none of the nodal query states 54 are compliant 86. The coordinator server 44 may thus sequentially poll each of the residual nodes 140 according to any sequence or order. Each worker server 46 or residual node 140 may respond with its corresponding nodal query state 54. Because each nodal query state 54 is thus separately retrieved, each nodal query state 54 may consume the entire memory capacity C (illustrated as reference numeral 100) allocated to the protective distributed database service 20.

The polling cycles 130 may be limited in count. As the number $N_w$ of the worker servers 46 increases, the query state data size limit 64 and/or the revised query state file size limit 150 may decrease. As the nodal count grows, in other words, the limits 64 and 150 may be become smaller (especially with the equal sharing 102). More and more nodal query states 54 may thus become too large and non-complaint 88. So, as the number $N_w$ of the worker servers 46 increases, the number of the polling cycles 130 may have to increase, and/or the sequential polling 170 may have to be implemented earlier. Simply put, larger clusters 28 may be limited in the number of the polling cycles 130 that can be conducted. Larger clusters 28 may have to revert to the sequential polling 170 sooner than smaller clusters 28. The hardware and software resources of the coordinator server 44 may also affect the number of polling cycles. A more-powerful coordinator server 44 having larger memory capacity C, for example, would store more data and thus allocate larger query state file size limits 64/150 to each worker server 46. Larger query state file size limits 64/150 would reduce the number of polling cycles.

The query state file size limits 64/150 thus greatly improve computer functioning. As data logging and data content have exponentially grown in use, databases must ingest and store ever-increasing amounts of the electronic data 30. The individual nodal query states 54, and the total query state 56, have also greatly grown in size. Any nodal query states 54, and/or the total query state 56, may thus cause the coordinator server 44 to crash (such as when a JAVA® machine runs out of the memory 74). A single computer system 22 (such as the coordinator server 44) simply may not be capable of storing today's large nodal query states 54 and/or the combined/merged query state 56. The query state file size limits 64/150, however, constrain the bit sizes of the nodal query states 54 and/or the combined/merged query state 56. The query state file size limits 64/150 ensure that no single nodal query state 54, nor the combined/merged query state 56, can exceed the memory capacity C (illustrated as reference numeral 100) available to the coordinator server 44. The protective distributed database service 20 thus restricts memory consumption to prevent computer crashes.

The query state file size limits 64/150 further improve computer functioning. One of the most frequently used structures to handle large databases is to organize the computer nodes 26 in a hierarchical structure (such as the computing cluster 28). This hierarchical structure would give a simple tree structure in which the coordinator server 44 is the root node of the tree and the worker servers 46 being internal nodes and leaves in the tree. Whenever the database query 48 is issued, every node 26 may ask for the merged state of its child nodes 26. Say each node 26 has k children, then each node 26 would handle merging k query states 54 together. This would result in a tree of depth $\log_k(n)$ where n is the number of nodes 26 in the tree. The advantage of this approach is that each node 26 only has to merge k states in its working memory, which makes it resilient to an overload of work on each individual node. The main disadvantage of this approach is that the cluster 28 must wait on $\log_k(n)$ network calls which could be slow in practice. Another approach would be to submit the nodal query states 54 sequentially to the coordinator server 44, which then merges the nodal query states 54 from the worker servers 46 one by one. This has the disadvantage of both the high workload of the coordinator and having many network requests. The protective distributed database service 20, however, is pragmatic and builds upon the sequential approach. The protective distributed database service 20 implements a greedy approach which consumes as much of the query state 56 merged in the coordinator 44 as possible in each polling round 130. The protective distributed database service 20 further ensures that the coordinator 44 will not be flooded with too much query state which would make it crash. The worker servers 46 may thus be polled (such as in parallel). In the first polling round 130*a*, for example, all workers 46 are asked to send their nodal query states 54 to the coordinator 44, if their nodal query state 54 is within the nth of the memory capacity C (illustrated as reference numeral 100), where n is the number of worker servers/nodes 46/26 for the given query. All the received nodal query states 54 are merged into an in-progress query state 56, which is carried on between polling rounds. If all worker servers/nodes 46/26 respond with their nodal query states 54, then polling halts or stops and the final resulting query state 56 is kept until the coordinator 44 is told to poll again.

Polling may continue. If one or more worker servers/nodes 46/26 respond that their nodal query state 54 is too large, the second/subsequent polling round 130*b* is conducted. Suppose, for example, that k workers 46 responded that their nodal query states 54 were too large for the previous polling round 130*a*. Now, the coordinator 44 asks the k workers 46 to send their nodal query states 54 less than, or equal to, a kth of the memory capacity C. All the nodal query states 54 are merged into the in-progress state. This polling may be repeated until all the nodal query states 54 are received, or until a polling round is encountered in which no workers 46 are able to respond, or until the query state sequential polling decision 172 is determined.

The protective distributed database service 20 ensures that the coordinator 44 cannot run out of the memory capacity C. The coordinator server 46 handles the incoming nodal query states 54, as in each polling round 130 the coordinator server 44 can at most receive k*(C/k), ensuring the coordinator 46 will never run out of memory. The protective distributed database service 20 thus greedily consumes the memory capacity C in each polling round/cycle 130. The protective distributed database service 20 updates or revises the query state file size limits 64/150 from round to round. Since the query state file size limits 64/150 are bound to the number of remaining residual nodes 140, the protective distributed database service 20 ensures that the limits 64/150 increase each poll (thereby giving each worker server/node 46/26 a better chance of sending their state 54 from round to round). The protective distributed database service 20, however, also ensures that the coordinator server 46 will never be sent more state 54 than it can handle. On the other hand, the protective distributed database service 20 is a pragmatic approach, as if no workers 46/26 can send their state 54 (due to it being larger than the limits 64/150), then the protective distributed database service 20 may switch to the sequential polling 170.

The protective distributed database service 20 further improves computer functioning. The protective distributed database service 20 retains known and reliable query schemes for small nodal query states 54. If no worker 46 has a query state 54 larger than the limit 64, then all workers 46 may send their nodal query state 46 to the coordinator server 44 for merging. The protective distributed database service 20, however, defers larger nodal query states 46 for subsequent polling cycles 130, thus protecting the coordinator server 44 from memory overload.

The distributed database service 20 may be improved. The distributed database service 20, for example, may poll the worker servers/nodes 46/26 as soon as the memory capacity C (illustrated as reference numeral 100) has available space. The distributed database service 20 may thus clear or free a portion of the memory capacity C after receiving and counting/processing any nodal query state 54. The distributed database service 20 may also poll groups of the worker servers/nodes 46/26, as each group member could then have a larger share of the memory capacity C. The distributed database service 20 may also optimize the polling cycles 130 based on reported or expected byte sizes of the nodal query states 54. The distributed database service 20 may also hierarchically poll the worker servers/nodes 46/26. The distributed database service 20, for example, may implement sub-coordinator nodes 26 and 44 that manage, collect, and merge a number of the nodal query states 54. Larger clusters 28 may thus be subdivided or sub-grouped and managed by the sub-coordinator nodes to speed-up processing of the nodal query states 54.

Figure 21:
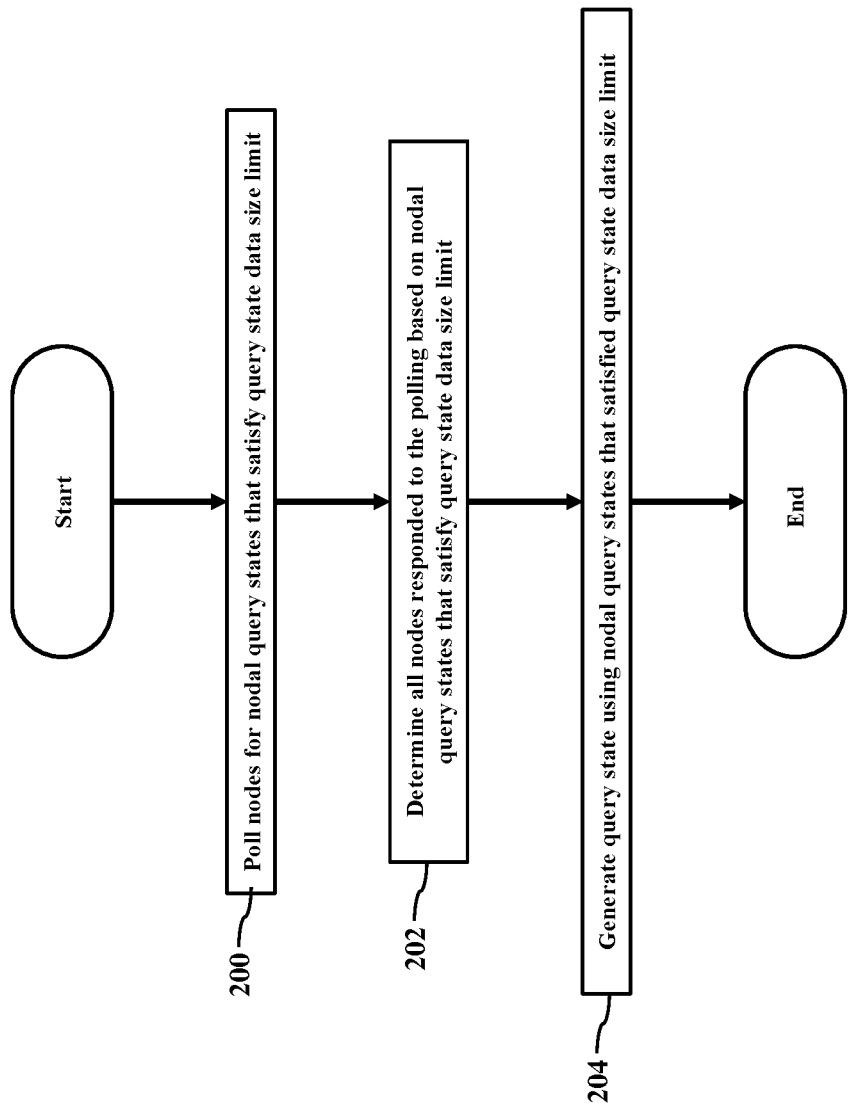
FIG. 21 illustrates examples of a method or operations that generate/generates a query state associated with a distributed database.

FIG. 21 illustrates examples of a method or operations that generate/generates the query state 56 associated with the distributed database 34. The computer nodes 26 (such as the worker servers 46) are polled for the nodal query states 54 that satisfy the query state data size limit 64 (Block 200). All the nodes 26 are determined to have responded to the polling based on the nodal query states 54 that satisfied the query state data size limit 64 (Block 202). The query state 56 is generated using the nodal query states 54 that satisfied the query state data size limit 64 (Block 204).

Figure 22:
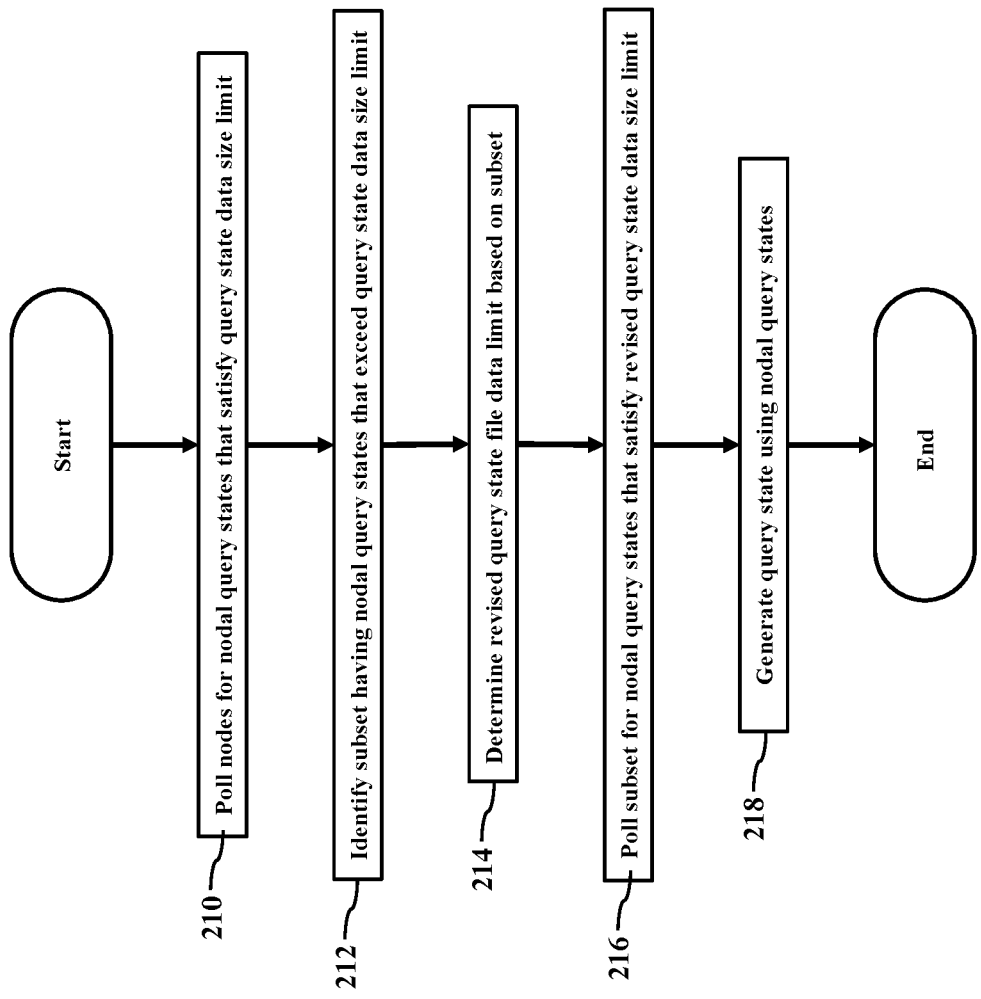
FIG. 22 illustrates more examples of a method or operations that generate/generates a query state associated with the distributed database.

FIG. 22 illustrates more examples of a method or operations that generate/generates the query state 56 associated with the distributed database 34. The computer nodes 26 (such as the worker servers 46) are polled for the nodal query states 46 that satisfy the query state data size limit 64 (Block 210). The subset 142 of the nodes 26 is identified whose nodal query states 46 exceed the query state data size limit 64 (Block 212). The revised query state file size limit 150 is determined based on the subset 142 of the nodes 26 (Block 214). The subset 142 of the nodes 26 is polled for the nodal query states 46 that satisfy the revised query state file size limit 150 (Block 216). The query state 56 is generated using the nodal query states 54 (Block 218).

Figure 23:
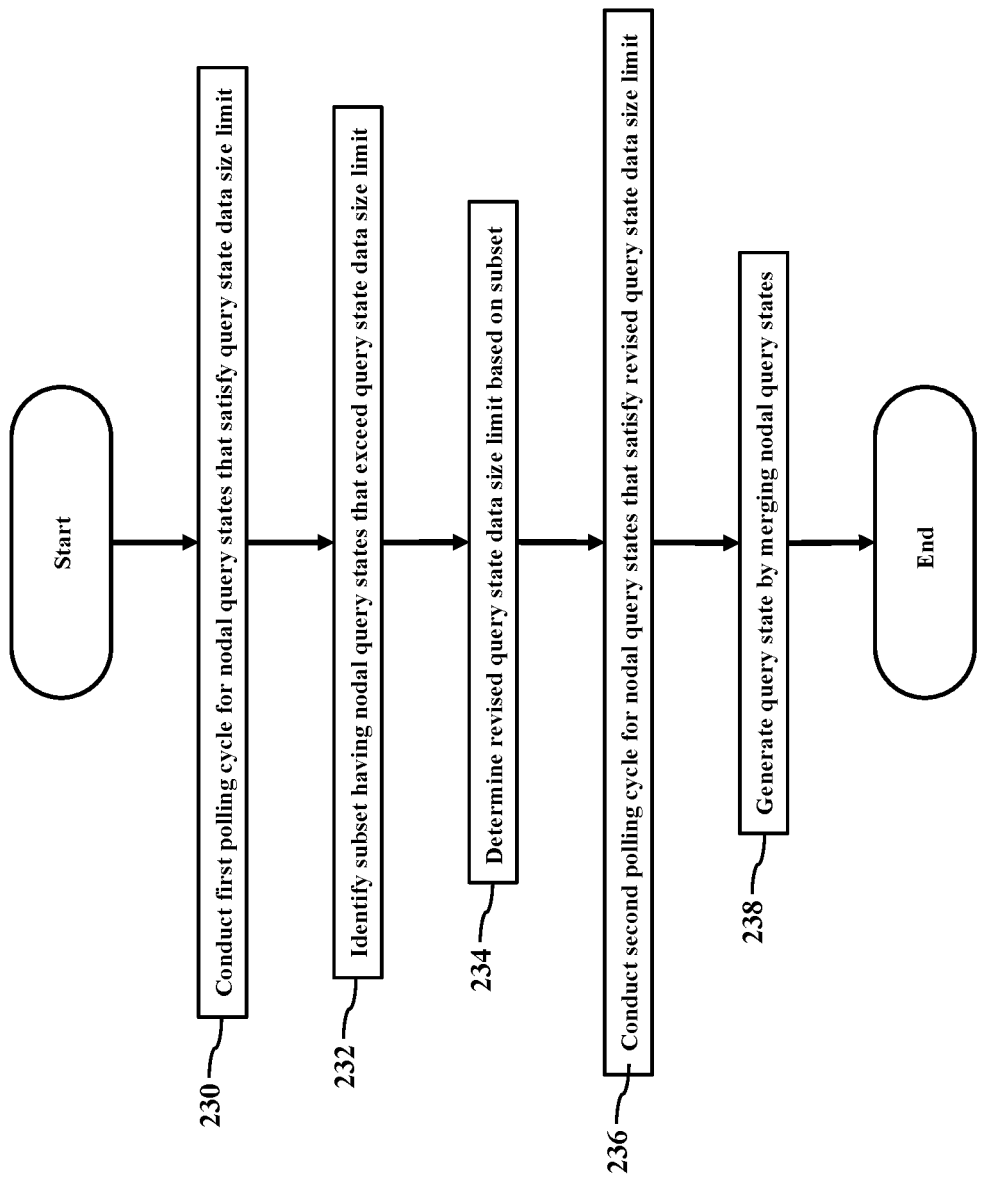
FIG. 23 illustrates still more examples of a method or operations that generate/generates a query state associated with the distributed database.

FIG. 23 illustrates still more examples of a method or operations that generate/generates the query state 56 associated with the distributed database 34. The first polling cycle 130a is conducted that polls the computer nodes 26 (such as the worker servers 46) for the nodal query states 46 that satisfy the query state data size limit 64 (Block 230). The subset 142 of the nodes 26 is identified whose nodal query states 46 exceed the query state data size limit 64 (Block 232). The revised query state file size limit 150 is determined based on the subset 142 of the nodes 26 (Block 234). The second polling cycle 130b is conducted that polls the subset 142 of the nodes 26 for the nodal query states 46 that satisfy the revised query state file size limit 150 (Block 236). The query state 56 is generated by merging the nodal query states 46 (Block 238).

Figure 24:
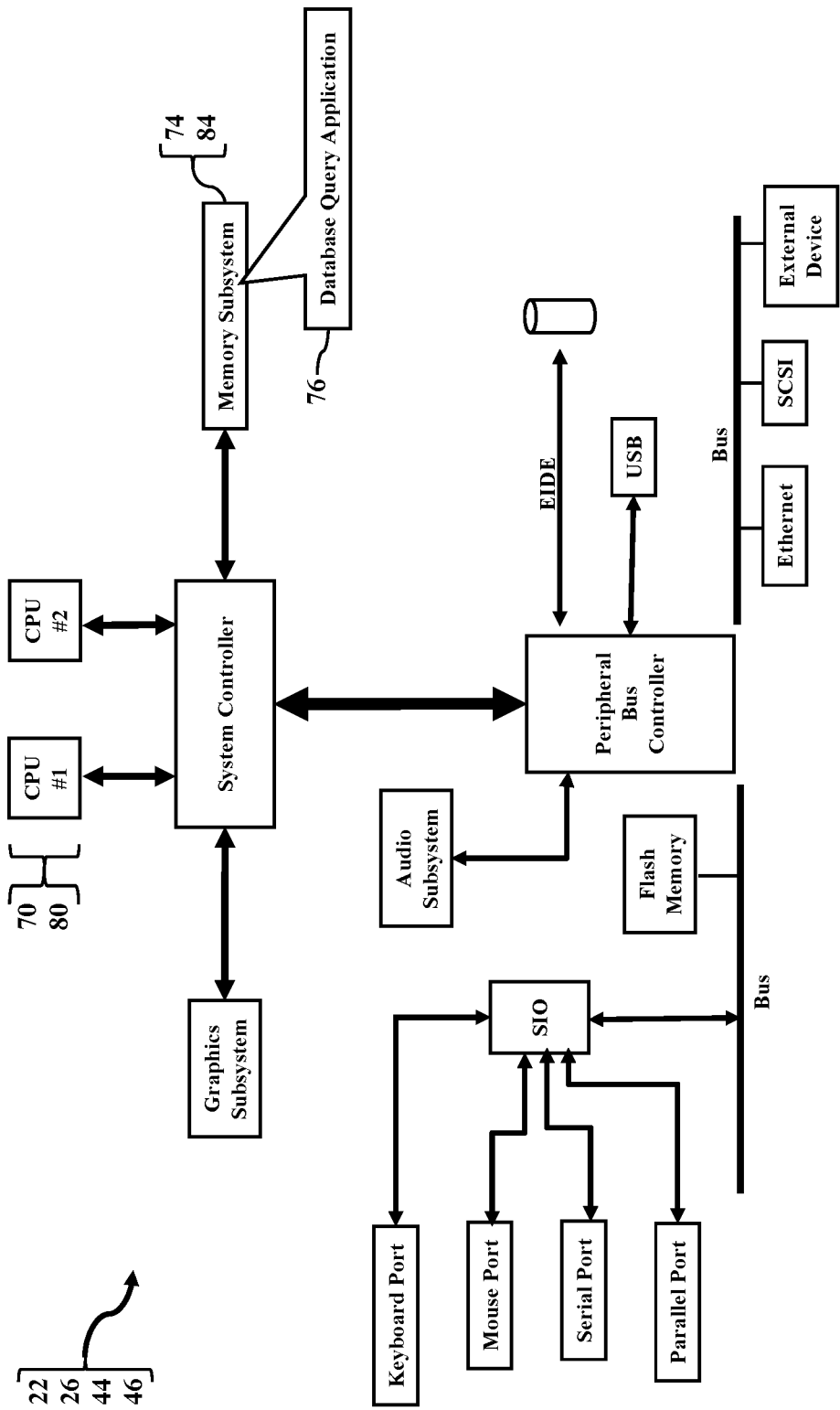
FIG. 24 illustrates a more detailed example of the operating environment.

FIG. 24 illustrates a more detailed example of the operating environment. FIG. 24 is a more detailed block diagram illustrating the computer system 22. The computer system 22 may represent the computer node 26, the coordinator server 44, and the worker server 46. The database query application 76 is stored in the memory subsystems or devices 74 and 84 (as explained with reference to FIGS. 5-6). One or more of the processors 70/80 (also explained with reference to FIGS. 5-6) communicate with the memory subsystem or device 74/84 and execute the database query application 76. Examples of the memory subsystem or device 74/84 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology. Because the computer system 22 is known to those of ordinary skill in the art, no detailed explanation is needed.

The computer system 22 may have any embodiment. This disclosure mostly discusses the computer system 22 as the computer node 26, the coordinator server 44, and the worker server 46. The query state data size limit 64, the polling cycles 130, the revised query state file size limit 150, and/or the query state sequential polling decision 172, however, may be easily adapted to other operating environments, such as a switch, router, or any other network member of the computing cluster 28. The query state data size limit 64, the polling cycles 130, the revised query state file size limit 150, and/or the query state sequential polling decision 172 may also be easily adapted to other devices, such as where the computer system 22 may be a laptop computer, a smartphone, a tablet computer, or a smartwatch. The query state data size limit 64, the polling cycles 130, the revised query state file size limit 150, and/or the query state sequential polling decision 172 may also be easily adapted to other embodiments of smart devices, such as a television, an audio device, a remote control, and a recorder. The query state data size limit 64, the polling cycles 130, the revised query state file size limit 150, and/or the query state sequential polling decision 172 may also be easily adapted to still more smart appliances, such as washers, dryers, and refrigerators. Indeed, as cars, trucks, and other vehicles grow in electronic usage and in processing power, the query state data size limit 64, the polling cycles 130, the revised query state file size limit 150, and/or the query state sequential polling decision 172 may be easily incorporated into any vehicular controller.

Any examples may be applied regardless of the networking environment. The query state data size limit 64, the polling cycles 130, the revised query state file size limit 150, and/or the query state sequential polling decision 172 may be easily adapted to stationary or mobile devices having wide-area networking (e.g., 4G/LTE/5G cellular), wireless local area networking (WI-FI®), near field, and/or BLUETOOTH® capability. The query state data size limit 64, the polling cycles 130, the revised query state file size limit 150, and/or the query state sequential polling decision 172 may be applied to stationary or mobile devices utilizing any portion of the electromagnetic spectrum and any signaling standard (such as the IEEE 802 family of standards, GSM/CDMA/TDMA or any cellular standard, and/or the ISM band). The query state data size limit 64, the polling cycles 130, the revised query state file size limit 150, and/or the query state sequential polling decision 172, however, may be applied to any processor-controlled device operating in the radio-frequency domain and/or the Internet Protocol (IP) domain. The query state data size limit 64, the polling cycles 130, the revised query state file size limit 150, and/or the query state sequential polling decision 172 may be applied to any processor-controlled device utilizing a distributed computing network, such as the Internet (sometimes alternatively known as the "World Wide Web"), an intranet, a local-area network (LAN), and/or a wide-area network (WAN). The query state data size limit 64, the polling cycles 130, the revised query state file size limit 150, and/or the query state sequential polling decision 172 may be applied to any processor-controlled device utilizing power line technologies, in which signals are communicated via electrical wiring. Indeed, the many examples may be applied regardless of physical componentry, physical configuration, or communications standard(s).

The computer system 22 may utilize any processing component, configuration, or system. For example, the query state data size limit 64, the polling cycles 130, the revised query state file size limit 150, and/or the query state sequential polling decision 172 may be easily adapted to any desktop, mobile, or server central processing unit or chipset offered by INTEL®, ADVANCED MICRO DEVICES®, ARM®, APPLE®, TAIWAN SEMICONDUCTOR MANUFACTURING®, QUALCOMM®, or any other manufacturer. The computer system 22 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When any of the central processing units or chipsets execute instructions to perform "operations," this could include the central processing unit or chipset performing the operations directly and/or facilitating, directing, or cooperating with another device or component to perform the operations.

The computer system 22 may use packetized communications. When the computer system 22 communicates via the communications network 24 (illustrated in FIG. 1), information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

The communications network 24 may utilize any signaling standard. The communications network 24 and/or the computer cluster 28 may mostly use wired networks to interconnect the network members. However, the communications network 24 and/or the computer cluster 28 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The communications network and the cloud-computing environment 130 may also utilize other standards, such as the I.E.E.E. 802 family of standards, the Industrial, Scientific, and Medical band of the electromagnetic spectrum, BLUETOOTH®, low-power or near-field, and any other standard or value.

The query state data size limit 64, the polling cycles 130, the revised query state file size limit 150, and/or the query state sequential polling decision 172 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for generating the query state 56, as the above paragraphs explain.

The diagrams, schematics, illustrations, and the like represent conceptual views or processes illustrating examples of protective distributed database service 20. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A memory device storing instructions that, when executed by at least one central processing unit, perform operations that protect a coordinator node's memory capacity for storing a query state associated with a distributed database, the operations comprising:
- determining, by a coordinator node having the coordinator node's memory capacity, shard sizes stored by worker nodes associated with the distributed database;
- generating nodal query state byte size limits associated with the worker nodes, a nodal query state byte size limit of the nodal query state byte size limits assigned to a corresponding worker node of the worker nodes, and the nodal query state byte size limit based on the coordinator node's memory capacity and a corresponding shard size of the shard sizes stored by the corresponding worker node;
- conducting a first polling cycle that polls each worker node of the worker nodes for nodal query states by imposing the nodal query state byte size limit assigned to the corresponding worker node;
- storing, in the memory device, the nodal query states sent by the worker nodes that satisfy the nodal query state byte size limit associated with generated based on the coordinator node's memory capacity and the corresponding shard size stored by the corresponding worker node;
- in response to the storing of the nodal query states sent by the worker nodes that satisfy the nodal query state byte size limit, identifying remaining worker nodes of the worker nodes whose nodal query states exceeded the nodal query state byte size limit generated based on the coordinator node's memory capacity and the corresponding shard size stored by the corresponding worker node;
- clearing, from the memory device, the nodal query states sent by the worker nodes that satisfy the nodal query state byte size limit;
- generating a revised query state byte size limit based on the coordinator node's memory capacity and a numerical count of the remaining worker nodes;
- conducting a second polling cycle that polls the remaining worker nodes for the nodal query states that satisfy the revised query state data size limit;
- receiving the nodal query states sent by the remaining worker nodes that satisfy the revised query state byte size limit; and
- protecting the coordinator node's memory capacity by generating the query state associated with the distributed database that merges the nodal query states sent by the worker nodes that satisfy the nodal query state byte size limit and sent by the remaining worker nodes that satisfy the revised query state byte size limit.

2. The memory device of claim 1, wherein the operations further comprise determining the query state byte size limit based on a bit size of the corresponding shard size.

3. The memory device of claim 1, wherein the operations further comprise determining compliant nodal query states of the nodal query states by matching IP addresses assigned to the worker nodes.

4. The memory device of claim 1, wherein the operations further comprise determining non-compliant nodal query states of the nodal query states by matching query and response counts.

5. The memory device of claim 1, wherein the operations further comprise determining a worker node count of the worker nodes associated with the distributed database.

6. The memory device of claim 1, wherein the operations further comprise determining IP addresses associated with the worker nodes.

7. The memory device of claim 1, wherein the operations further comprise specifying the nodal query state byte size limit.

8. A method executed by a computer system that protects a coordinator node's memory capacity for storing a query state associated with a distributed database, comprising:
- determining, by a coordinator node having the coordinator node's memory capacity, shard sizes stored by worker nodes associated with the distributed database;
- generating, by the coordinator node, nodal query state byte size limits associated with the worker nodes, a nodal query state byte size limit of the nodal query state byte size limits assigned to a corresponding worker node of the worker nodes, and the nodal query state byte size limit based on the coordinator node's memory capacity and a corresponding shard size of the shard sizes stored by the corresponding worker node;
- conducting, by the coordinator node, a first polling cycle that polls each worker node of the worker nodes for nodal query states by imposing the nodal query state byte size limit assigned to the corresponding worker node;
- storing, by the coordinator node to a memory device having the coordinator node's memory capacity, the nodal query states sent by the worker nodes that satisfy the nodal query state byte size limit associated with generated based on the coordinator node's memory capacity and the corresponding shard size stored by the corresponding worker node;
- in response to the storing of the nodal query states sent by the worker nodes that satisfy the nodal query state byte size limit, identifying, by the coordinator node, remaining worker nodes of the worker nodes whose nodal query states exceeded the nodal query state byte size limit generated based on the coordinator node's memory capacity and the corresponding shard size stored by the corresponding worker node;
- clearing, by the coordinator node from the memory device, the nodal query states sent by the worker nodes that satisfy the nodal query state byte size limit;
- generating, by the coordinator node, a revised query state byte size limit based on the coordinator node's memory capacity and a numerical count of the remaining worker nodes;
- conducting, by the coordinator node, a second polling cycle that polls the remaining worker nodes for the nodal query states that satisfy the revised query state data size limit;
- receiving, by the coordinator node, the nodal query states sent by the remaining worker nodes that satisfy the revised query state byte size limit; and
- protecting, by the coordinator node, the coordinator node's memory capacity by generating the query state associated with the distributed database that merges the nodal query states sent by the worker nodes that satisfy the nodal query state byte size limit and sent by the remaining worker nodes that satisfy the revised query state byte size limit.

9. The method of claim 8, further comprising determining the query state byte size limit based on a bit size of the corresponding shard size.

10. The method of claim 8, further comprising determining compliant nodal query states of the nodal query states by matching IP addresses assigned to the worker nodes.

11. The method of claim 8, further comprising determining non-compliant nodal query states of the nodal query states by matching query and response counts.

12. The method of claim 8, further comprising determining a worker node count of the worker nodes associated with the distributed database.

13. The method of claim 8, further comprising determining IP addresses associated with the worker nodes.

14. The method of claim 8, further comprising specifying the nodal query state byte size limit.

15. At least one computer system that protects a coordinator node's memory capacity for storing a query state associated with a distributed database, comprising:
- at least one central processing unit; and
- at least one memory device storing instructions that, when executed by the at least one central processing unit, perform operations, the operations comprising:
- determining shard sizes stored by worker nodes associated with the distributed database;
- generating nodal query state byte size limits associated with the worker nodes, a nodal query state byte size limit of the nodal query state byte size limits assigned to a corresponding worker node of the worker nodes, and the nodal query state byte size limit based on the coordinator node's memory capacity and a corresponding shard size of the shard sizes stored by the corresponding worker node;
- conducting a first polling cycle that polls each worker node of the worker nodes for nodal query states by imposing the nodal query state byte size limit assigned to the corresponding worker node;
- storing, to a memory device having the coordinator node's memory capacity, the nodal query states sent by the worker nodes that satisfy the nodal query state byte size limit associated with generated based on the coordinator node's memory capacity and the corresponding shard size stored by the corresponding worker node;
- in response to the receiving of the nodal query states sent by the worker nodes that satisfy the nodal query state byte size limit, identifying remaining worker nodes of the worker nodes whose nodal query states exceeded the nodal query state byte size limit generated based on the coordinator node's memory capacity and the corresponding shard size stored by the corresponding worker node;
- clearing, from the memory device, the nodal query states sent by the worker nodes that satisfy the nodal query state byte size limit;
- generating a revised query state byte size limit based on the coordinator node's memory capacity and a numerical count of the remaining worker nodes;
- conducting a second polling cycle that polls the remaining worker nodes for the nodal query states that satisfy the revised query state data size limit;
- receiving the nodal query states sent by the remaining worker nodes that satisfy the revised query state byte size limit; and
- protecting the coordinator node's memory capacity by generating the query state associated with the distributed database that merges the nodal query states sent by the worker nodes that satisfy the nodal query state byte size limit and sent by the remaining worker nodes that satisfy the revised query state byte size limit.

16. The at least one computer system claim 15, wherein the operations further comprise determining the query state byte size limit based on a bit size of the corresponding shard size.

17. The at least one computer system claim 15, wherein the operations further comprise determining compliant nodal query states of the nodal query states by matching IP addresses assigned to the worker nodes.

18. The at least one computer system claim 15, wherein the operations further comprise determining non-compliant nodal query states of the nodal query states by matching query and response counts.

19. The at least one computer system claim 15, wherein the operations further comprise determining a worker node count of the worker nodes associated with the distributed database.

20. The at least one computer system claim 15, wherein the operations further comprise specifying the nodal query state byte size limit.

* * * * *